(12) United States Patent
Choi et al.

(10) Patent No.: US 12,443,523 B2
(45) Date of Patent: Oct. 14, 2025

(54) STORAGE DEVICES AND METHODS OF OPERATING THE SAME

(71) Applicant: Samsung Electronics Co., Ltd., Suwon-si (KR)

(72) Inventors: Hyunjin Choi, Suwon-si (KR); Sunghyun Noh, Suwon-si (KR); Hyuk Lee, Suwon-si (KR); Kuiyon Mun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/744,826

(22) Filed: Jun. 17, 2024

(65) Prior Publication Data

US 2025/0123962 A1     Apr. 17, 2025

(30) Foreign Application Priority Data

Oct. 11, 2023    (KR) ........................ 10-2023-0134752

(51) Int. Cl.
*G06F 12/02*     (2006.01)
*G06F 13/16*     (2006.01)
*G06F 13/40*     (2006.01)

(52) U.S. Cl.
CPC ...... *G06F 12/0246* (2013.01); *G06F 13/1668* (2013.01); *G06F 13/4068* (2013.01)

(58) Field of Classification Search
None
See application file for complete search history.

(56) References Cited

U.S. PATENT DOCUMENTS

| | | |
|---|---|---|
| 8,208,326 B1 * | 6/2012 | Solt .................. G11C 29/10 |
| | | 365/201 |
| 10,025,747 B2 | 7/2018 | Swarbrick et al. |
| 10,121,013 B2 | 11/2018 | Chang et al. |
| 10,372,948 B2 | 8/2019 | Lin et al. |
| 10,901,917 B1 | 1/2021 | Volpe |
| 10,957,380 B2 | 3/2021 | Shin et al. |
| 11,216,596 B2 | 1/2022 | Bae |
| 11,579,782 B2 | 2/2023 | Cho |

(Continued)

FOREIGN PATENT DOCUMENTS

KR       102329307 B1    11/2021

*Primary Examiner* — Kevin Verbrugge
(74) *Attorney, Agent, or Firm* — Wolf, Greenfield & Sacks, P.C.

(57) ABSTRACT

A method of operating a storage device including a nonvolatile memory device and a storage controller that is configured to control the nonvolatile memory device, the method comprising: partitioning the nonvolatile memory device into a plurality of domains; determining a scramble function based on a seed value of seed bits that correspond to a first portion of a plurality of address bits of a logical address among a plurality of logical addresses that are provided from a host device; generating a scrambled domain value based on the scramble function and a domain value of domain bits that correspond to a second portion of the plurality of address bits of the logical address among the plurality of logical addresses; and assigning a write operation that corresponds to the logical address to a domain that corresponds to the scrambled domain value among the plurality of domains.

20 Claims, 31 Drawing Sheets

(56) References Cited

U.S. PATENT DOCUMENTS

| | | | |
|---|---|---|---|
| 2009/0204824 A1* | 8/2009 | Lin | G06F 21/72 |
| | | | 714/E11.041 |
| 2013/0117617 A1* | 5/2013 | Oh | G11C 29/18 |
| | | | 714/E11.177 |
| 2014/0250341 A1* | 9/2014 | Mullarkey | G06F 11/10 |
| | | | 714/724 |
| 2015/0227473 A1* | 8/2015 | Feng | G06F 21/79 |
| | | | 713/193 |
| 2019/0370189 A1 | 12/2019 | Wang et al. | |
| 2022/0019357 A1* | 1/2022 | Cho | G06F 3/0679 |
| 2022/0100416 A1 | 3/2022 | Zhu et al. | |
| 2023/0185463 A1* | 6/2023 | Cho | G06F 12/0646 |
| | | | 711/163 |

* cited by examiner

FIG. 14

| VD | 0 | 1 | 2 | 3 | 0 | 1 | 2 | 3 | 0 | 1 | 2 | 3 | 0 | 1 | 2 | 3 | ... |
|---|---|---|---|---|---|---|---|---|---|---|---|---|---|---|---|---|---|
| LA | 0 | 1 | 2 | 3 | 4 | 5 | 6 | 7 | 8 | 9 | 10 | 11 | 12 | 13 | 14 | 15 | |
| | ⇩ $f_0$ | | | | ⇩ $f_1$ | | | | ⇩ $f_2$ | | | | ⇩ $f_3$ | | | | |
| SLA | 1 | 2 | 0 | 3 | 6 | 5 | 7 | 4 | 11 | 8 | 9 | 10 | 12 | 14 | 13 | 15 | ... |
| SVD | 1 | 2 | 0 | 3 | 2 | 1 | 3 | 0 | 3 | 0 | 1 | 2 | 0 | 2 | 1 | 3 | |
| | ←— UR —→ | | | | ←— UR —→ | | | | ←— UR —→ | | | | ←— UR —→ | | | | |

| VD | 0 | 0 | 1 | 1 | 2 | 2 | 3 | 3 | 0 | 0 | 1 | 1 | 2 | 2 | 3 | 3 | ... |
| LA | 0 | 1 | 2 | 3 | 4 | 5 | 6 | 7 | 8 | 9 | 10 | 11 | 12 | 13 | 14 | 15 | |

⇩f0 ⇩f1

| SLA | 3 | 4 | 5 | 6 | 1 | 2 | 7 | 8 | 12 | 13 | 10 | 11 | 14 | 15 | 8 | 9 | ... |
| SVD | 1 | 1 | 2 | 2 | 0 | 0 | 3 | 3 | 2 | 2 | 1 | 1 | 3 | 3 | 0 | 0 | |

|←—— UR ——→|←—— UR ——→|

STORAGE DEVICES AND METHODS OF OPERATING THE SAME

CROSS-REFERENCE TO RELATED APPLICATIONS

This U.S. non-provisional application claims priority under 35 USC § 119 to Korean Patent Application No. 10-2023-0134752, filed on Oct. 11, 2023, in the Korean Intellectual Property Office (KIPO), the disclosure of which is incorporated by reference herein in its entirety.

BACKGROUND OF THE INVENTION

1. Technical Field

Example embodiments relate generally to semiconductor integrated circuits, and more particularly to storage devices and methods of operating the storage devices.

2. Description of the Related Art

Storage devices using nonvolatile memory devices, such as solid state drives (SSDs), have become popular in recent years. Such storage devices have the advantage of not having mechanical drives such that the storage devices may be more reliable and durable and may access information very quickly (e.g., quicker than storage devices using the mechanical drives) and consume less power. Recently, as electronic circuits are applied not only to electronic systems such as laptops, but also to various types of systems such as cars, airplanes, and drones, the storage devices using nonvolatile memory devices are used in various types of systems. If access is concentrated in a certain area of the storage devices, the endurance and performance of the storage devices may decrease.

SUMMARY OF THE INVENTION

Some example embodiments may provide a storage device and a method of operating the storage device, capable of efficiently distributing accesses to the storage device.

According to example embodiments, a method of operating a storage device including a nonvolatile memory device and a storage controller that is configured to control the nonvolatile memory device, the method comprising: partitioning the nonvolatile memory device into a plurality of domains; determining a scramble function based on a seed value of seed bits that correspond to a first portion of a plurality of address bits of a logical address among a plurality of logical addresses that are provided from a host device; generating a scrambled domain value based on the scramble function and a domain value of domain bits that correspond to a second portion of the plurality of address bits of the logical address among the plurality of logical addresses; and assigning a write operation that corresponds to the logical address to a domain that corresponds to the scrambled domain value among the plurality of domains.

According to example embodiments, a storage device comprising: a nonvolatile memory device that includes a plurality of domains; and a storage controller that is configured to control the nonvolatile memory device, the storage controller including: a scramble circuit that is configured to determine a scramble function based on a seed value of seed bits that correspond to a first portion of a plurality of address bits of a logical address among a plurality of logical addresses that are provided from a host device and is configured to generate a scrambled domain value based on the scramble function and a domain value of domain bits that correspond to a second portion of the plurality of address bits of the logical address among the plurality of logical addresses; and a processor that is configured to assign a write operation that corresponds to the logical address to a domain that corresponds to the scrambled domain value among the plurality of domains.

According to example embodiments, a method of operating a storage device including a nonvolatile memory device and a storage controller that is configured to control the nonvolatile memory device, the method comprising: partitioning the nonvolatile memory device into a plurality of domains; determining a scramble function based on a seed value of seed bits that correspond to a first portion of a plurality of address bits of a logical address among a plurality of logical addresses that are provided from a host device; generating a scrambled domain value based on the scramble function and a domain value of domain bits that correspond to a second portion of the plurality of address bits of the logical address among the plurality of logical addresses; assigning a write operation that corresponds to the logical address to a domain that corresponds to the scrambled domain value among the plurality of domains; and responsive to receiving a request from the host device for performing a same operation with respect to an address range that includes a plurality of sequential logical addresses among the plurality of logical addresses, classifying the address range into a body range and an edge range, wherein the generating the scrambled domain value comprises: omitting the generating the scrambled domain value with respect to the body range.

The storage devices and the methods of operating the storage devices according to example embodiments may improve endurance and performance of the storage devices by preventing input and output from being crowded into a particular domain, through the two-stage address scramble that determines the scramble function based on the seed value of the logical address and scrambles the domain value of the logical address based on the scramble function.

Further, the storage devices and the methods of operating the storage devices according to example embodiments may efficiently support the range operation by selectively performing the address scramble with classifying an address range into the body range and the edge range in the case of the range operation that performs the same operation on the address range.

BRIEF DESCRIPTION OF THE DRAWINGS

Example embodiments of the present disclosure will be more clearly understood from the following detailed description taken in conjunction with the accompanying drawings.

FIG. 14 is a diagram illustrating an example embodiment of an address scramble using the address bit setting of FIG. 12 and the scramble functions of FIG. 13.

DETAILED DESCRIPTION OF THE INVENTION

Figure 1:
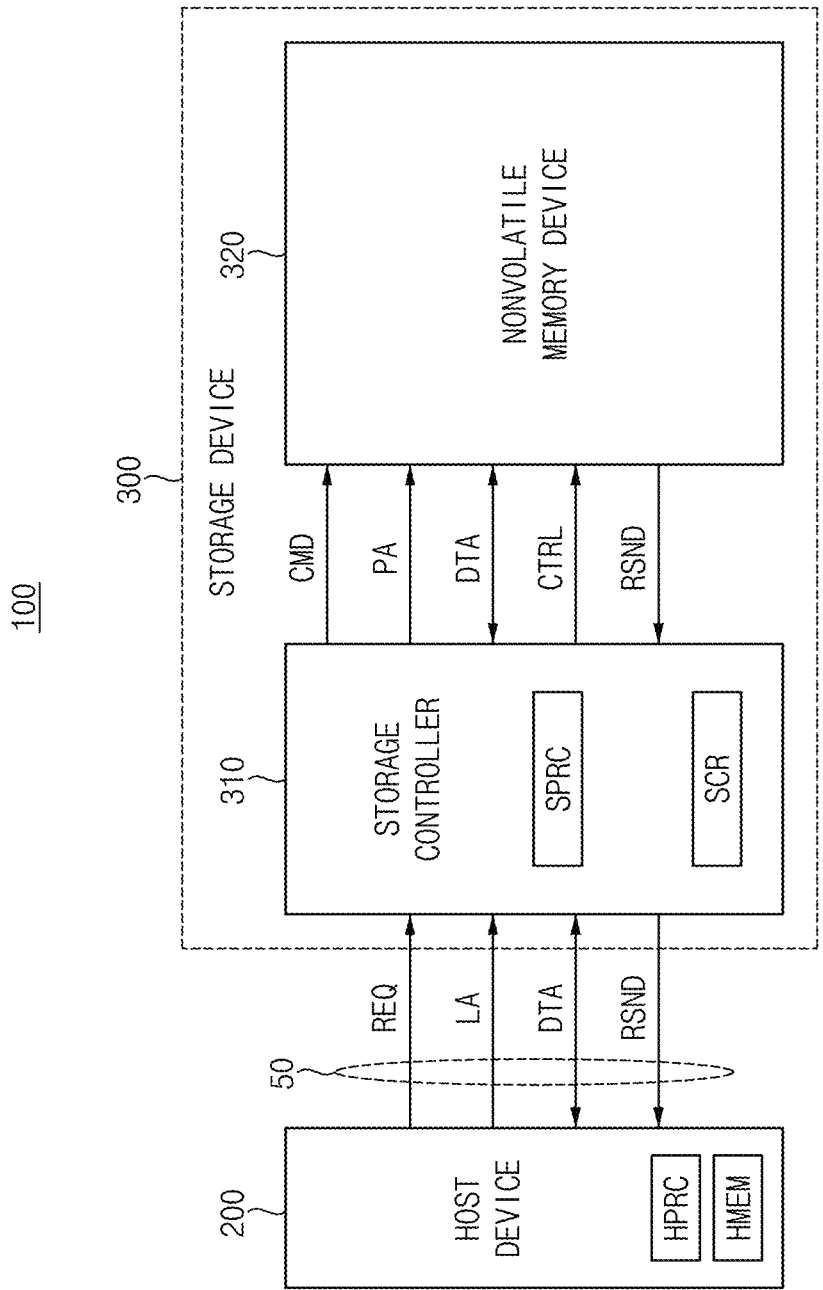
FIG. 1 is a block diagram illustrating a storage system according to example embodiments.

Various example embodiments will be described more fully hereinafter with reference to the accompanying drawings, in which some example embodiments are shown. In the drawings, like numerals may refer to like elements throughout unless clearly indicated otherwise. The repeated descriptions may be omitted.

Figure 2:
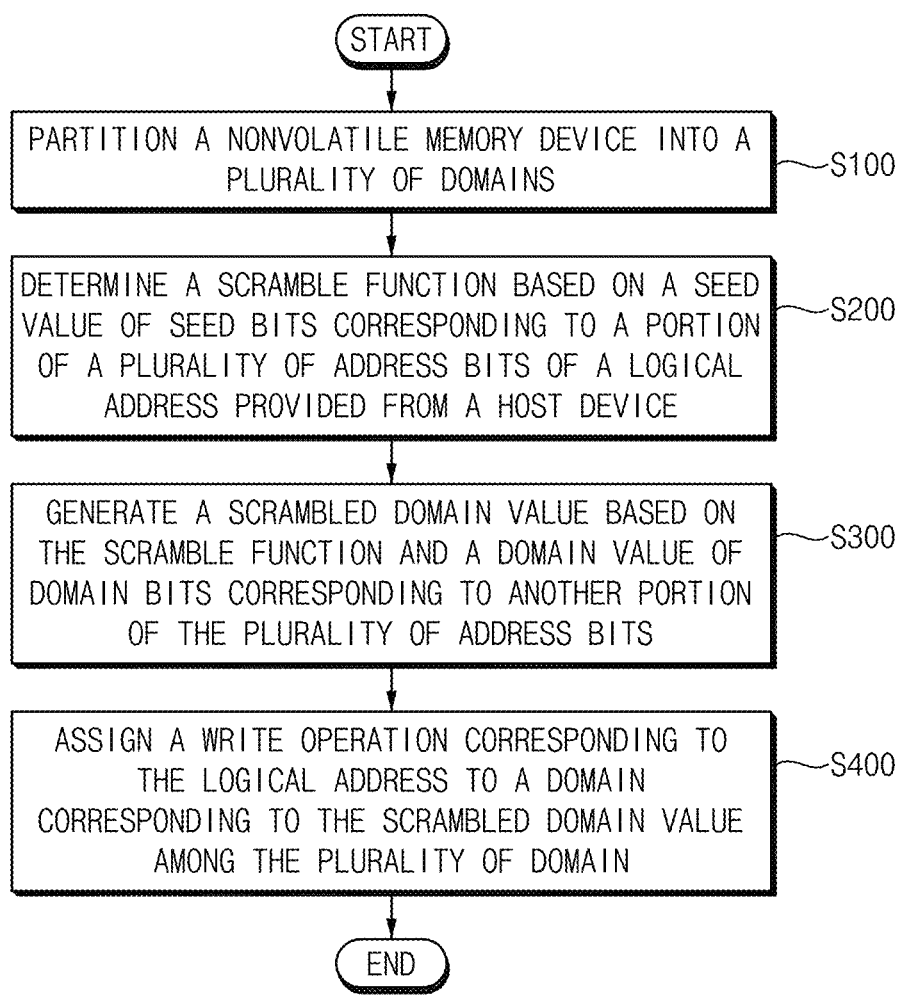
FIG. 2 is a flowchart illustrating a method of operating a storage device according to example embodiments.

FIG. 1 is a block diagram illustrating a storage system according to example embodiments, and FIG. 2 is a flowchart illustrating a method of operating a storage device according to example embodiments.

Referring to FIG. 1, a storage system 100 may include a host device 200, a storage device 300, and a link 50 connecting (e.g., electrically connecting) the host device 200 and the storage device 300. The storage device 300 may include a storage controller 310 and a nonvolatile memory device 320. For example, the storage device 300 may be a solid state drive (SSD), an embedded multimedia card (eMMC), a universal flash storage (UFS) device, or the like, but is not limited thereto. In one embodiment, the link 50 may be a peripheral component interconnect express (PCIe) link, but is not limited thereto. It will be understood that when an element or layer is referred to as being "connected to" or "coupled to" another element or layer, it may be directly on, connected to, or coupled to the other element or layer, or one or more intervening elements or layers may be present. In contrast, when an element is referred to as being "directly coupled," "directly connected," or "directly responsive to", or "directly on," another element, there are no intervening elements present. In addition, "electrical connection" conceptually includes a physical connection and a physical disconnection.

The host device 200 may be a data processing device capable of processing data, such as a central processing unit (CPU), a processor, a microprocessor, or an application processor, but is not limited thereto. The storage device 300 may be embedded in an electronic device with the host device 200, or the storage device 300 may be removably electrically connected to (e.g., physically detachable from and electrically connected to) an electronic device that includes the host device 200.

The host device 200 may control the overall operation of the storage system 100. The host device 200 may include a host processor HPRC and a host memory HMEM.

The host processor HPRC may execute software (e.g., applications, operating system (OS), and/or device drivers). The host processor HPRC may run, for example, an operating system (OS) that is loaded into the host memory HMEM. A file system may be implemented as software executed by the host processor HPRC as a portion of the operating system (OS). The host processor HPRC may also execute various applications that will run on the operating system (OS). The host processor HPRC may be provided as a homogeneous multi-core processor or a heterogeneous multi-core processor. A multi-core processor is a computing component having at least two independently operable processor cores (hereinafter referred to as cores). Each of the cores may independently read and execute program instructions. As used herein, the term "and/or" includes any and all combinations of one or more of the associated listed items.

The host memory HMEM may store instructions and data that are executed and processed by the host processor HPRC. For example, the operating system (OS) and/or the applications may be loaded into the host memory HMEM during the booting sequence. For example, upon booting of the storage system 100, the operating system (OS) stored on the storage device 300 may be loaded into the host memory HMEM, and the applications may be subsequently loaded into the host memory HMEM by the operating system (OS).

The host device 200 may send data operation requests, i.e., a request REQ and a logical address LA, to the storage controller 310, and may send and receive data DTA to and from the storage controller 310. The storage controller 310 may transmit a response RSND responding to the request REQ to the host device 200. The request REQ may include a data read request, a data write request, and/or a data erase request.

The storage controller 310 may control the nonvolatile memory device 320 in response to the request REQ from the host device 200. By providing the nonvolatile memory device 320 with a physical address PA that maps to (that is mapped by) the logical address LA, a command CMD, and a control signal CTRL, the storage controller 310 may perform read operations and/or write operations on the nonvolatile memory device 320. The write operations may be referred to as program operations. The storage controller 310 may perform flash translation layer (FTL) operations to translate the logical address LA transmitted from the host device 200 into the physical address PA.

For example, the storage controller 310 may control the nonvolatile memory device 320 to read out data stored in the nonvolatile memory device 320 in response to a data read request (e.g., a data read request of the request REQ) received from the host device 200, or to write data in the nonvolatile memory device 320 in response to a data write request (e.g., a data write request of the request REQ) received from the host device 200. Further, the nonvolatile memory device 320 may be controlled to erase the data stored in the nonvolatile memory device 320 in response to an erase request (e.g., an erase request of the request REQ) received from the host device 200. The nonvolatile memory device 320 may transmit the response RSND corresponding to the command CMD to the storage controller 310.

The nonvolatile memory device 320 may be implemented as one or more nonvolatile memories, such as flash memory, magnetic RAM (MRAM), ferroelectric RAM (FeRAM), phase change RAM (PRAM), and resistive RAM (ReRAM), but the type of the nonvolatile memory device 320 is not limited thereto. The nonvolatile memory device 320 may be connected to (e.g., electrically connected to) the storage controller 310 via a plurality of channels. For convenience of description, the nonvolatile memory device 320 may be exemplified and described below as a NAND flash memory device. Embodiments of configurations and operations of the storage device 300 including a NAND flash memory device will be described below with reference to FIGS. 30 through 33.

The storage controller 310 may include a storage processor SPRC to control the overall operation of the storage controller 310 and a scramble circuit SCR to support methods of operating the storage device 300 according to example embodiments.

Referring to FIGS. 1 and 2, the storage controller 310 may partition the nonvolatile memory device 320 into a plurality of domains (S100). The storage controller 310 may partition the storage area of the nonvolatile memory device 320 into the plurality of domains in any appropriate manner depending on the configuration, the storage capacity, the operation speed, etc. of the nonvolatile memory device 320. Embodiments of partitioning and setting the domains will be described below with reference to FIGS. 7 through 19.

The scramble circuit SCR may determine a scramble function based on a seed value of seed bits corresponding to a portion of the plurality of address bits of the logical address LA provided from the host device 200 (S200). The scramble function may be a form of a mathematical function, such as an equation, but is not limited thereto. The scramble circuit SCR may generate a scrambled domain value based on the scramble function and a domain value of domain bits corresponding to another portion of the plurality of address bits (S300). Various embodiments of the address scramble performed by the scramble circuit SCR will be described below.

Based on the scrambled domain value, the storage processor SPRC may assign, among the plurality of domains, a write operation corresponding to the logical address LA to a domain corresponding to the scrambled domain value (S400). Embodiments of the domain assignment will be described below with reference to FIGS. 11 and 15.

When the storage device 300 has a parallel input/output (I/O) processing structure, the addresses (e.g., the logical addresses LA) of the host device (e.g., the host device 200) may be partitioned into address regions managed by each parallel processor. Conventional static address distribution may assign the addresses of the host device to each domain in the storage device (e.g., the storage device 300) in a fixed order, such as a round-robin method, which is widely used because of its simple structure and operation. Since the (assigned or distributed) logical addresses within a domain are linear and/or static, it has the advantage that sequential operations may be performed when address ranges are required to be processed, thereby resulting in performance gains. For example, a certain range of addresses within a domain may be sequentially calculated to have a performance improvement.

In multi-domain environments, static address distribution may be vulnerable to I/O being crowded into some domains, which may be referred to as I/O skew. For example, as will be described below with reference to FIG. 16, if logical addresses (e.g., the logical addresses LA) corresponding to multiples of 4, such as 0, 4, 8, etc. are received sequentially from the host device (e.g., the host device 200), I/O and workloads may be crowded into certain domains. I/O skew may result in reduced endurance and reduced performance of the storage device (e.g., the storage device 300), and additional features such as global wear leveling may be needed to address such issues.

The storage device 300 and the method of operation of the storage device 300 according to example embodiments may improve the endurance and performance of the storage device 300 by preventing input and output (I/O) from being crowded into a particular domain through a two-stage address scramble that determines a scramble function based on the seed value of the logical address LA and then scrambles the domain value of the logical address LA based on the scramble function.

Figure 3:
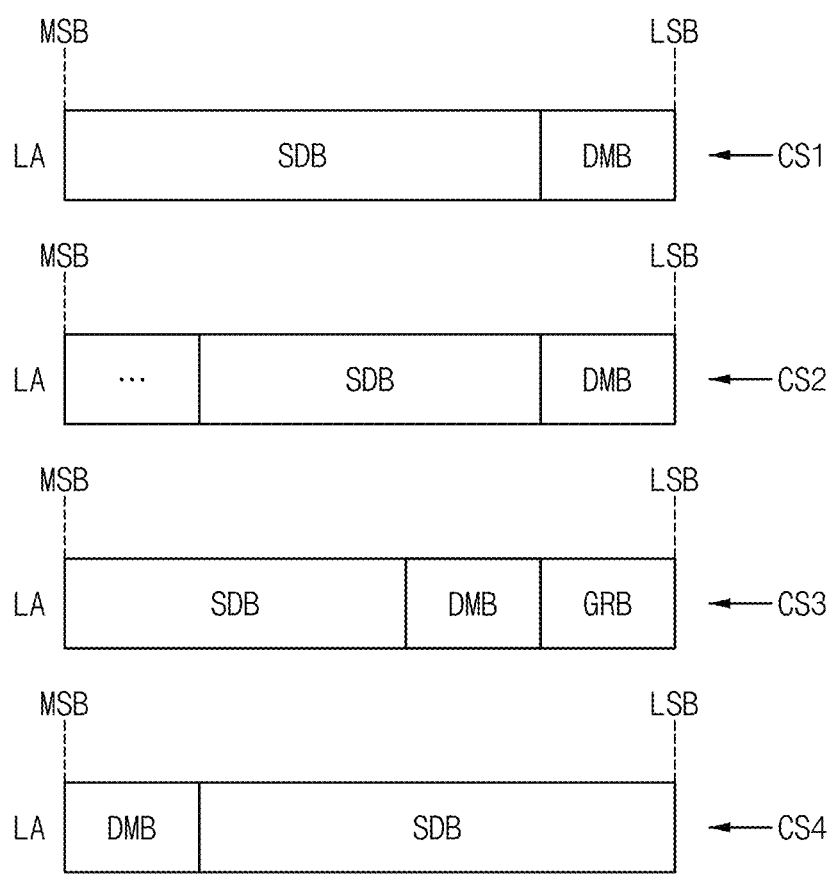
FIG. 3 is a diagram illustrating example embodiments of address bit setting in a method of operating a storage device according to example embodiments.

FIG. 3 is a diagram illustrating example embodiments of address bit setting in a method of operating a storage device according to example embodiments.

Referring to FIG. 3, a logical address LA provided by a host device (e.g., the host device 200) may include a plurality of address bits ranging from a least significant bit LSB to a most significant bit MSB. The storage controller (e.g., the storage controller 310) may set a portion of the plurality of address bits as seed bits SDB and another portion of the plurality of address bits as domain bits DMB. According to example embodiments, the storage controller 310 may set still another portion of the plurality of address bits as granularity bits GRB.

In one embodiment, as in a first case CS1, the storage controller may set the adjacent address bits including the least significant bit LSB to be the domain bits DMB and set all of the higher bits (more significant bits or bits closer to the most significant bit MSB) than the domain bits DMB to be the seed bits SDB.

In one embodiment, as in a second case CS2, the storage controller may set the adjacent address bits including the least significant bit LSB to be the domain bits DMB and set a portion of the higher bits than the domain bits DMB to be the seed bits SDB. In this case, the seed bits SDB and the domain bits DMB may be set to be adjacent to each other.

In one embodiment, as in a third case CS3, the storage controller may set the adjacent address bits including the least significant bit LSB to be the granularity bits GRB, set a portion of the higher bits than the granularity bits GRB to be the domain bits DMB, and set all of the higher bits than the domain bits DMB to be the seed bits SDB.

In one embodiment, as in a fourth case CS4, the storage controller may set the adjacent address bits including the most significant bit MSB to be the domain bits DMB and set all of the lower bits (less significant bits or bits closer to the least significant bit LSB) than the domain bits DMB to be the seed bits SDB.

The determined address bit settings may be stored in the nonvolatile memory device (e.g., the nonvolatile memory device 320) as a portion of metadata for controlling the operations of the storage device (e.g., the storage device 300). In FIG. 3, four example embodiments of address bit settings are illustrated, but embodiments are not limited thereto.

Figure 4:
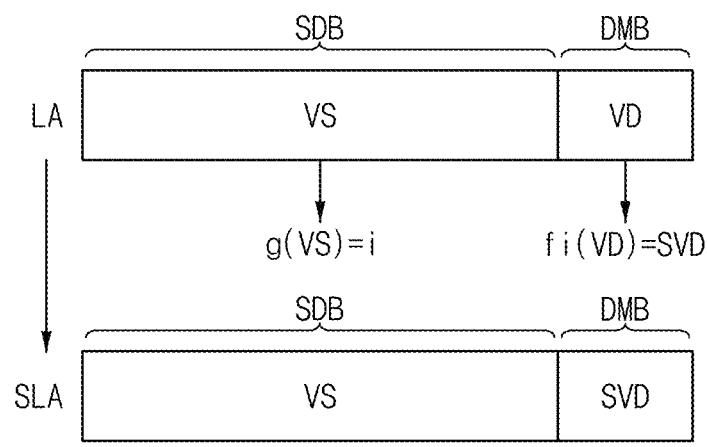
FIGS. 4 and 5 are diagrams illustrating example embodiments of an address scramble in a method of operating a storage device according to example embodiments.
Figure 5:
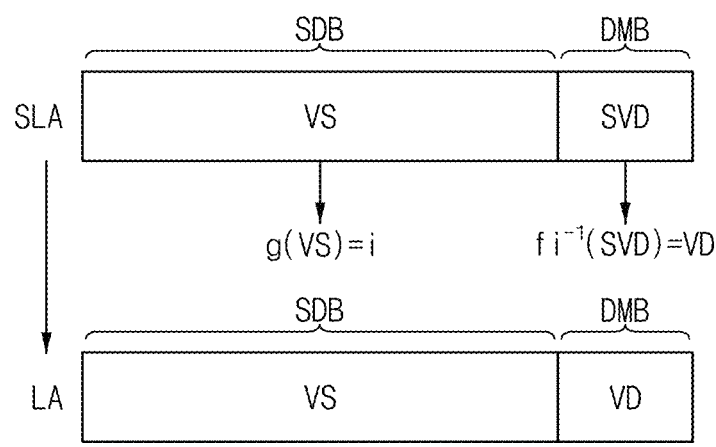

FIGS. 4 and 5 are diagrams illustrating example embodiments of an address scramble in a method of operating a storage device according to example embodiments.

Referring to FIGS. 1 and 4, the scramble circuit SCR may determine a scramble function 'fi' based on a seed value VS of seed bits SDB corresponding to a portion of the plurality of address bits of a logical address LA provided from the host device 200. The scramble function fi may be determined in a various methods. In one embodiment, the seed value VS may be input to a specific function 'g' to generate an index value 'i' representing the scramble function fi. For example, the index value i may represent one of a plurality of preset functions (preset scramble functions fi).

According to example embodiments, the method of determining the scramble function fi may be statically fixed or may be changed (dynamically). In other words, the function g for determining the scramble function fi may be a fixed function or a variable function. By (dynamically) changing the scramble function fi, access (e.g., the I/O) may be prevented from being concentrated in a particular domain during repetition of the same access pattern from the host device (e.g., the host device 200).

The scramble circuit SCR may generate a scrambled domain value SVD based on the scramble function fi and a domain value VD of domain bits DMB corresponding to another portion of the plurality of address bits of the logical address LA. In other words, the scrambled domain value SVD may be generated by inputting the domain value VD into the determined scramble function fi.

As shown in FIG. 4, the seed value VS of the seed bits SDB of a scrambled logical address SLA may be the same as the seed value VS of the seed bits SDB of the logical address LA provided from the host device 200. Meanwhile, the domain value VD of the domain bits DMB of the logical address LA may be replaced by the scrambled domain value SVD of the domain bits DMB of the scrambled logical address SLA.

FIG. 5 illustrates an address descramble in a method of operating a storage device according to example embodiments.

Referring to FIGS. 1 and 5, the scramble circuit SCR may determine the scramble function fi based on the seed value VS of the seed bits SDB of the scrambled logical address SLA. The scramble function fi may be determined in the same (or similar) method as the address scramble in FIG. 4. In one embodiment, the seed value VS may be input to a specific function 'g' to generate an index value 'i' representing the scramble function fi.

The scramble circuit SCR may restore the domain value VD of the domain bits of the logical address LA based on the scrambled domain value SVD of the domain bits DMB of the scrambled logical address SLA and the inverse function $fi^{-1}$ of the scrambled function fi. In other words, the domain value VD may be restored by inputting the scrambled domain value SVD into the inverse function $fi^{-1}$ of the scramble function fi.

As a result, the logical address LA before the address scramble may be restored by performing such address descramble on the scrambled logical address SLA.

Figure 6:
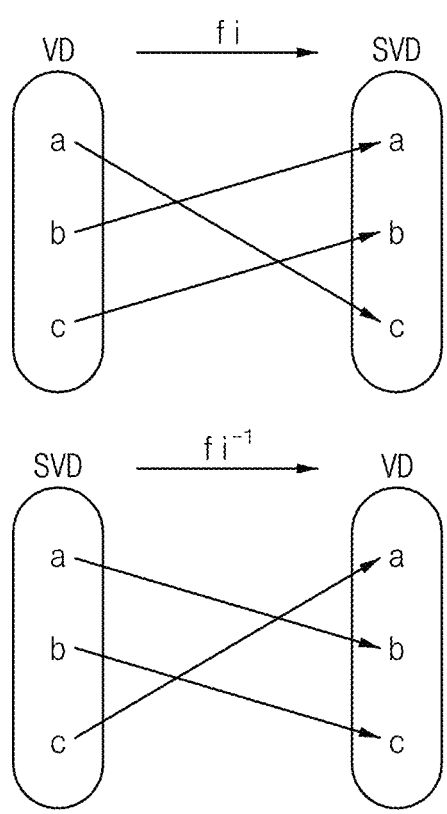
FIG. 6 is a diagram illustrating a scramble function in a method of operating a storage device according to example embodiments.

FIG. 6 is a diagram illustrating a scramble function in a method of operating a storage device according to example embodiments.

One example scramble function fi is illustrated in FIG. 6. As described with reference to FIG. 4, the scramble function fi may vary according to the seed value VS.

Referring to FIG. 6, all possible values (a, b, c) of the domain value VD and all possible values (a, b, c) of the scrambled domain value SVD may be equal and have a one-to-one correspondence, such that the inverse function $fi^{-1}$ of the scramble function fi may exist. For example, as shown in FIG. 6, the functional relationships fi(a)=c, fi(b)=a, fi(c)=b, $fi^{-1}$(a)=b, $fi^{-1}$(b)=c, and $fi^{-1}$(c)=a may be established. As such, consistency between address scramble and address descramble may be ensured by setting the scramble function (fi) such that the inverse function ($fi^{-1}$) exists.

FIGS. 7, 8, 9, and 10 are diagrams illustrating example embodiments of dividing and setting domains in a method of operating a storage device according to example embodiments.

Referring to FIGS. 7 through 10, a nonvolatile memory device (e.g., the nonvolatile memory device 320) may include a plurality of nonvolatile memories NVM11 through NVMjk (j, k each being a natural number greater than or equal to 2) each connected (e.g., electrically connected) to a plurality of channels CH1 through CHi (i being a natural number greater than or equal to 2). For example, the natural number i may be equal to a natural number j. Herein the number of the plurality of channels and the number of the plurality of nonvolatile memories may be varied and are not limited to the embodiments shown in FIGS. 7 through 10. It will be understood that, although the terms "i", "n", "j", "k", and so on may be used herein to indicate various natural numbers should not be limited by these terms. These terms are used to distinguish one natural number from another. Thus, a natural number "i" may be different natural numbers depending on the elements to which the natural number "i" indicates.

Each of the nonvolatile memories (e.g., NVM11 through NVMjk) may be NAND flash memory. However, the scope of the present disclosure is not limited thereto, and each of the plurality of nonvolatile memories may include at least one of a variety of nonvolatile memories, such as read only memory (ROM), programmable ROM (PROM), electrically programmable ROM (EPROM), electrically erasable and programmable ROM (EEPROM), phase-change RAM (PRAM), magnetic RAM (MRAM), resistive RAM (RRAM), ferroelectric RAM (FRAM), and the like.

Figure 7:
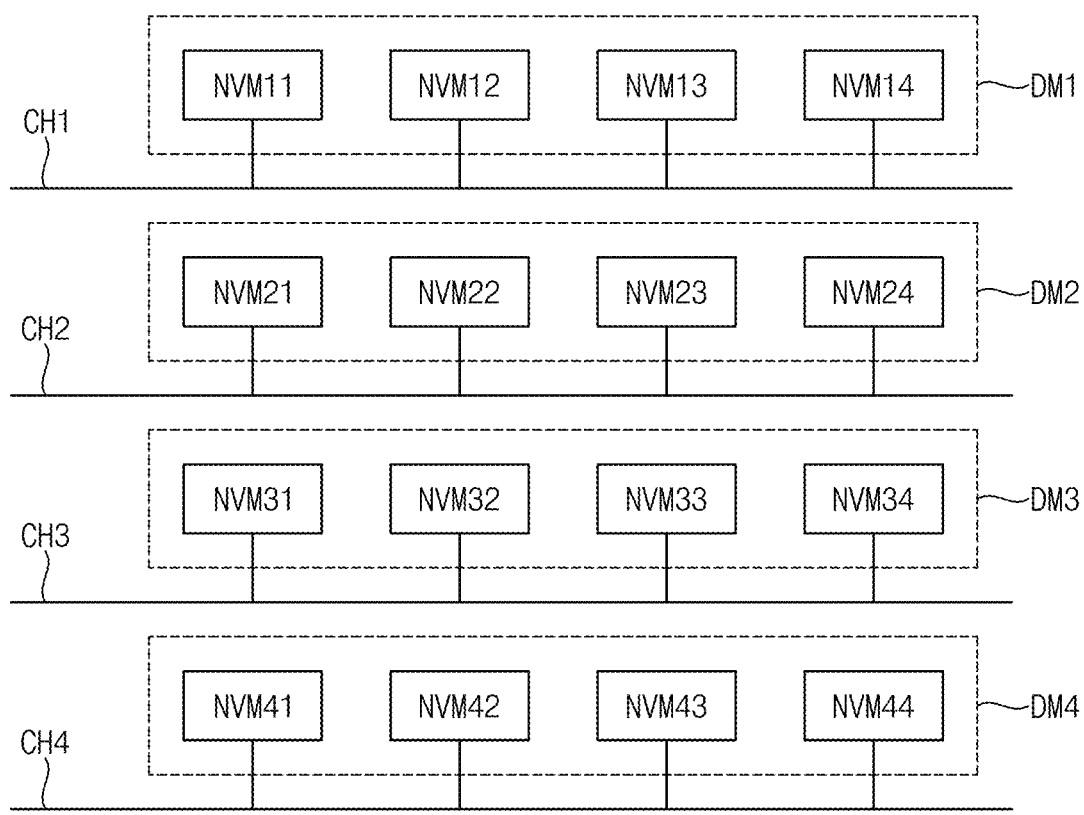
FIGS. 7, 8, 9 and 10 are diagrams illustrating example embodiments of dividing and setting domains in a method of operating a storage device according to example embodiments.

In one embodiment, as shown in FIG. 7, the nonvolatile memory device (e.g., the nonvolatile memory device 320) may be connected to (e.g., electrically connected to) the storage controller (e.g., the storage controller 310) via channels 1 to 4 CH1 to CH4. In this case, the nonvolatile memories NVM11, NVM12, NVM13, and NVM14 connected (e.g., electrically connected) to the first channel CH1 may be set as a first domain DM1, and the nonvolatile memories NVM21, NVM22, NVM23, and NVM24 connected (e.g., electrically connected) to the second channel CH2 may be set as a second domain DM2, the nonvolatile memories NVM31, NVM32, NVM33, and NVM34 connected (e.g., electrically connected) to the third channel CH3 may be set as a third domain DM3, and the nonvolatile memories NVM41, NVM42, NVM43, and NVM44 connected (e.g., electrically connected) to the fourth channel CH4 may be set as a fourth domain DM4.

Figure 8:
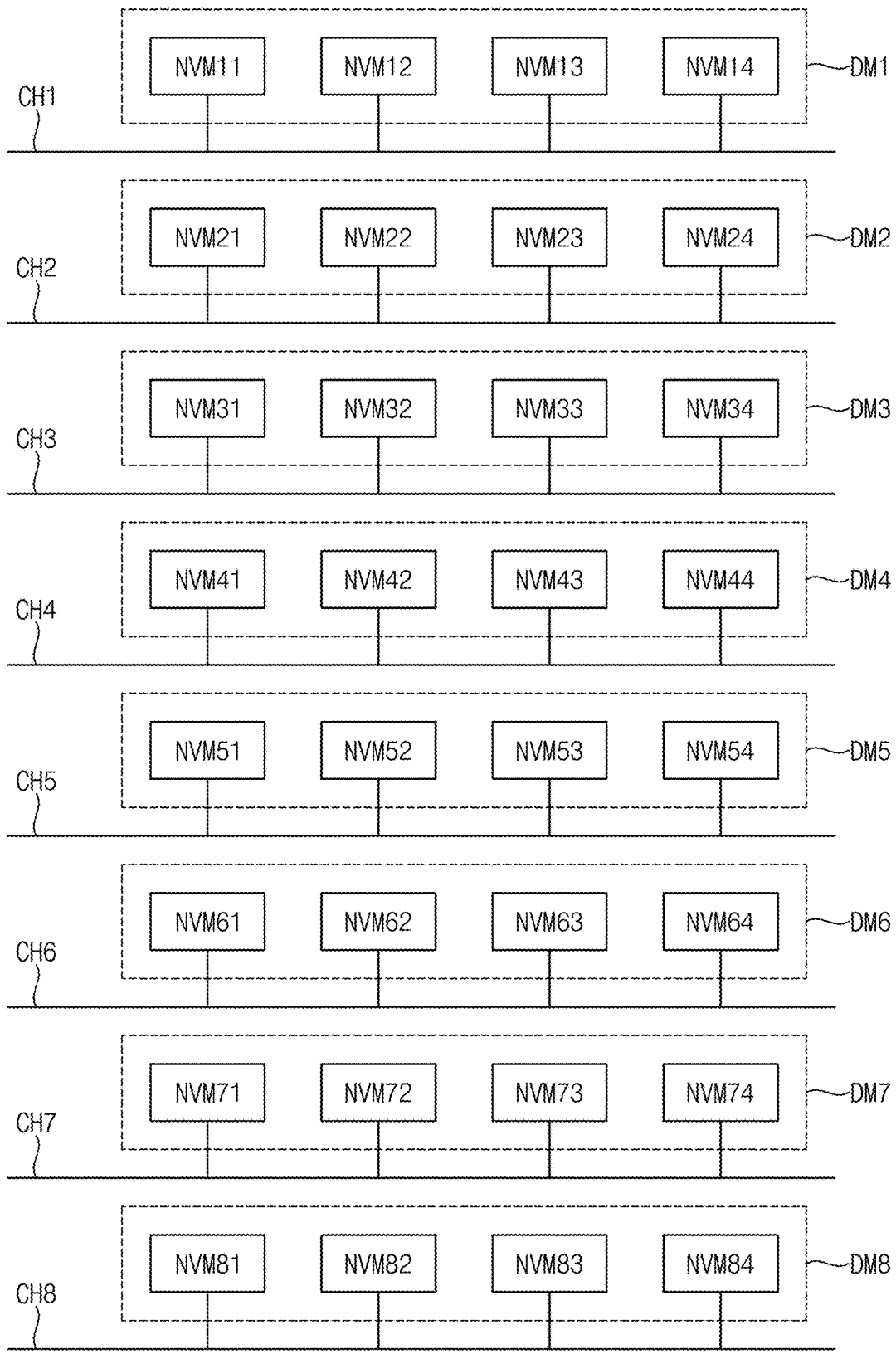

In one embodiment, as shown in FIG. 8, the nonvolatile memory devices (e.g., the nonvolatile memory device 320) may be connected (e.g., electrically connected) to the storage controller (e.g., the storage controller 310) via channels 1 to 8 CH1 to CH8. In this case, the nonvolatile memories NVM11, NVM12, NVM13, and NVM14 connected (e.g., electrically connected) to the first channel CH1 may be set as a first domain DM1, the nonvolatile memories NVM21, NVM22, NVM23, and NVM24 connected (e.g., electrically connected) to the second channel CH2 may be set as a second domain DM2, the nonvolatile memories NVM31, NVM32, NVM33, and NVM34 connected (e.g., electrically connected) to the third channel CH3 may be set as the third domain DM3, the nonvolatile memories NVM41, NVM42, NVM43, and NVM44 connected (e.g., electrically connected) to the fourth channel CH4 may be set as a fourth domain DM4, the nonvolatile memories NVM51, NVM52, NVM53, and NVM54 connected (e.g., electrically connected) to the fifth channel CH5 may be set as a fifth domain DM5, the nonvolatile memories NVM61, NVM62, NVM63, and NVM64 connected (e.g., electrically connected) to the sixth channel CH6 may be set as a sixth domain DM6, the nonvolatile memories NVM71, NVM72, NVM73, and NVM74 connected (e.g., electrically connected) to the seventh channel CH7 may be set as a seventh domain DM7, and the nonvolatile memories NVM81, NVM82, NVM83, and NVM84 connected (e.g., electrically connected) to the eighth channel CH8 may be set as a eighth domain DM8.

As such, the storage controller may set a number of domains based on a number of the plurality of channels connecting (e.g., electrically connecting) the nonvolatile memory device and the storage controller. Depending on the number of domains, the bit number of the domain bits DMB described above may be set, and the domain values VD of the domain bits DMB may represent the corresponding domains.

When the number of domains is 4, as in the example embodiment of FIG. 7, the bit number of the domain bits DMB may be set to 2. For example, a domain value VD of 00(b)=0(d) (where 'b' represents a binary number and 'd' represents a decimal number) may indicate a first domain DM1, a domain value VD of 01(b)=1(d) may indicate a second domain DM2, a domain value VD of 10(b)=2(d) may indicate a third domain DM3, a domain value VD of 11(b)=3(d) may indicate a fourth domain DM4.

When the number of domains is 8, as in the example embodiment of FIG. 8, the bit number of the domain bits DMB may be set to 3. For example, a domain value VD of 000(b)=0(d) may indicate a first domain DM1, a domain value VD of 001(b)=1(d) may indicate a second domain DM2, a domain value VD of 010(b)=2(d) may indicate a third domain DM3, a domain value VD of 011(b)=3(d) may indicate a fourth domain DM4, the domain value VD at 100(b)=4(d) may indicate the fifth domain DM5, the domain value VD at 101(b)=5(d) may indicate the sixth domain DM6, the domain value VD at 110(b)=6(d) may indicate the seventh domain DM7, and the domain value VD at 111(b)=7(d) may indicate the eighth domain DM8.

Figure 9:
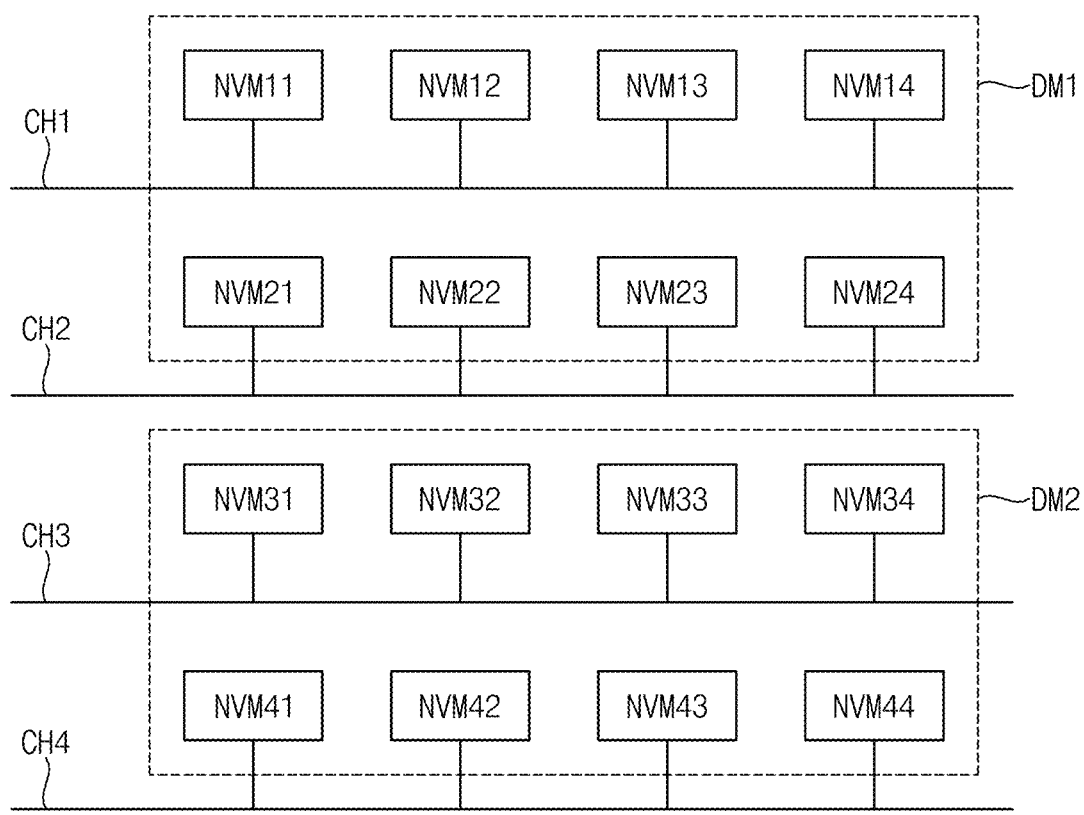
Figure 10:
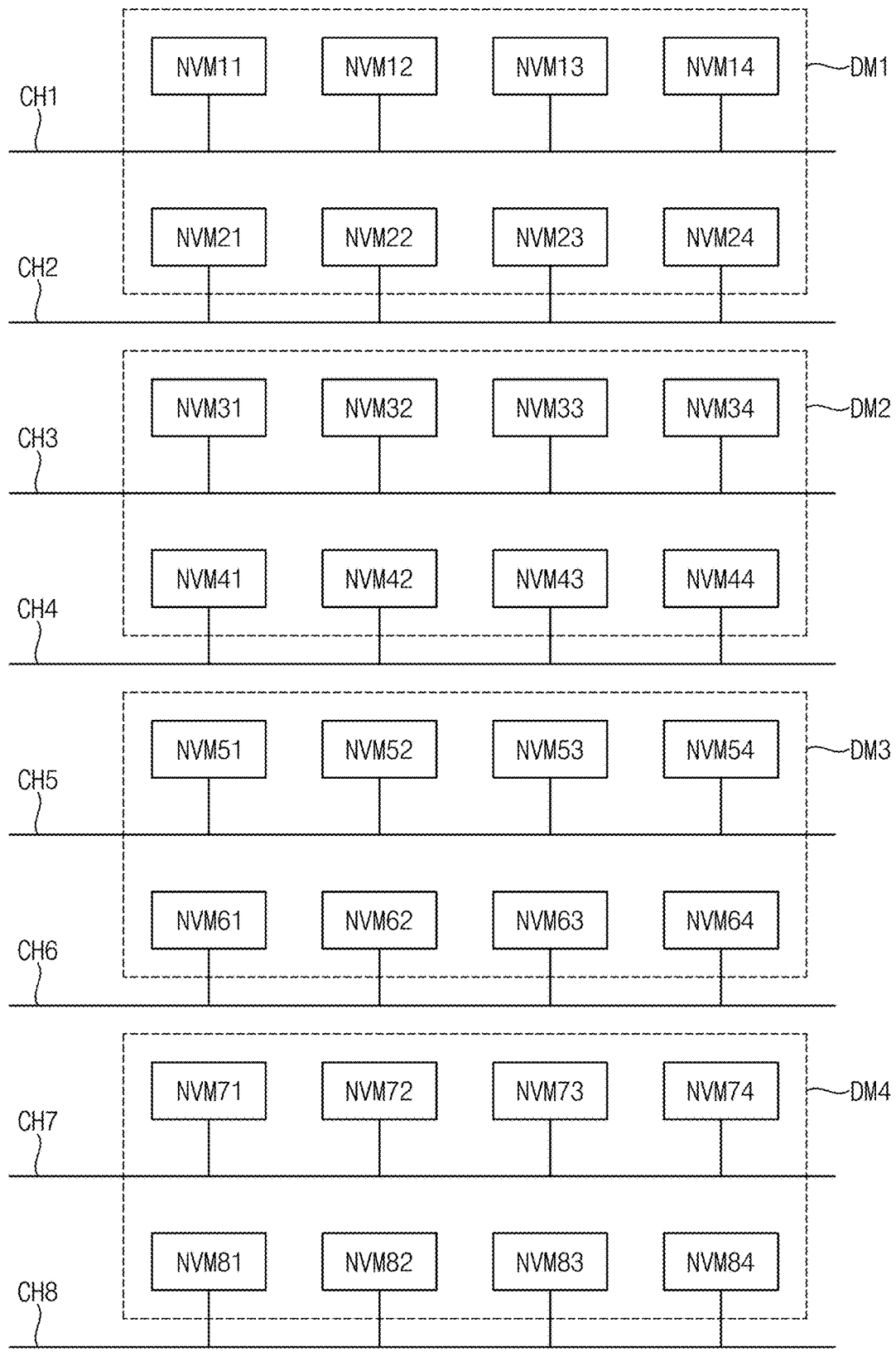

While FIGS. 7 and 8 illustrate an example where one domain is set per channel, example embodiments are not limited thereto. For example, as shown in FIGS. 9 and 10, one domain may be established for every two channels. Depending on example embodiment, one domain may be established for every three or more channels, or two or more domains may be established for every one channel.

Figure 11:
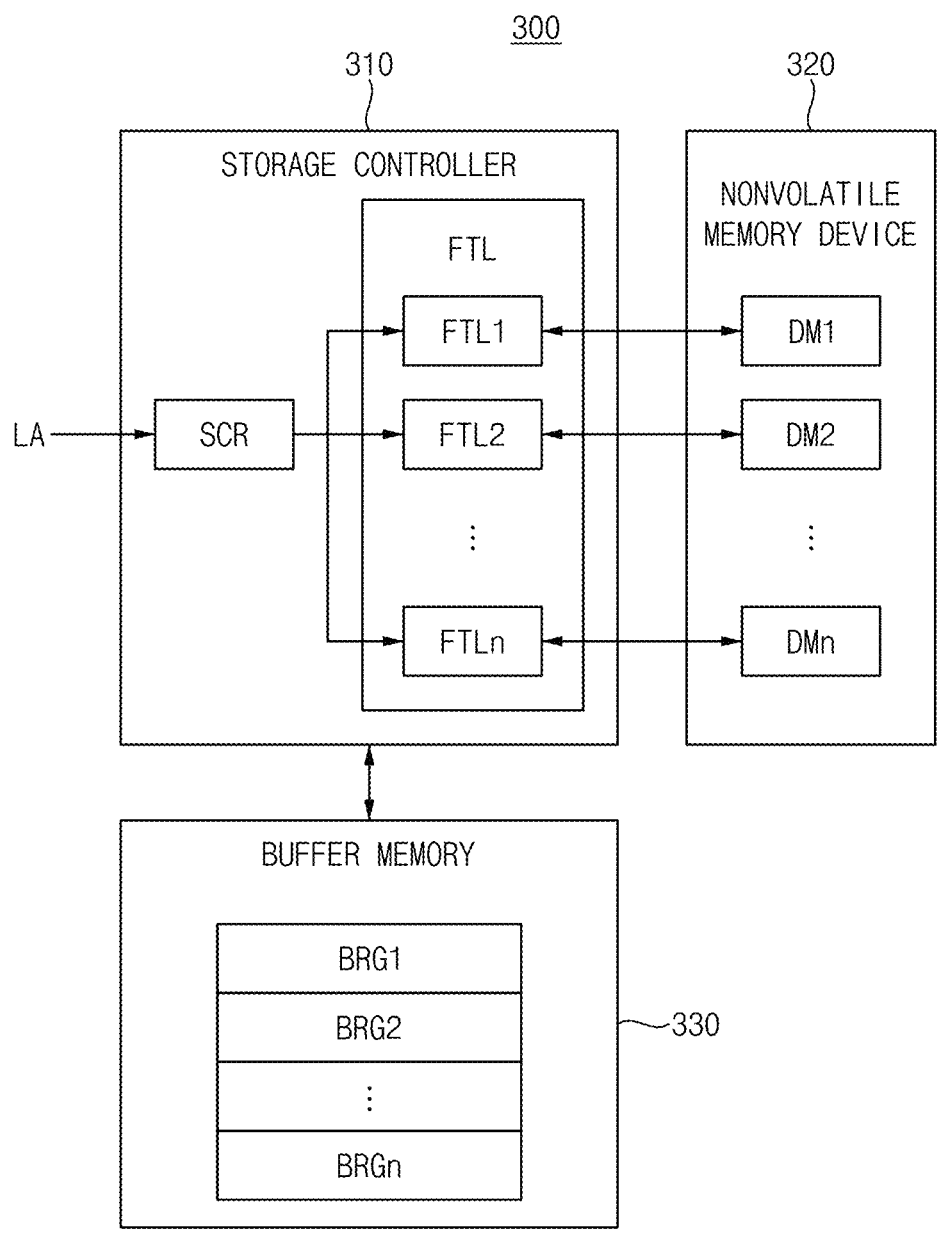
FIG. 11 is a block diagram illustrating storage device according to example embodiments.

FIG. 11 is a block diagram illustrating storage device according to example embodiments. Description that is redundant to FIG. 1 may be omitted hereinafter.

Referring to FIG. 11, a storage device 300 may include a storage controller 310, a nonvolatile memory device 320, and a buffer memory 330. The storage controller 310 may be configured to process various requests from the host device (e.g., the host device 200 referring to FIG. 1). For example, the storage controller 310 may store data in and/or read stored data from the nonvolatile memory device 320 in response to a request (e.g., the request REQ) from the host device.

The storage controller 310 may communicate with (connected to or electrically connected to) the nonvolatile memory device 320 over a plurality of channels (e.g., the channels CH referring to FIGS. 7, 8, 9, and 10). As described above, the nonvolatile memory device 320 may be partitioned into a plurality of domains DM1 through DMn.

The buffer memory 330 may store data and/or output stored data under the control of the storage controller 310. For example, the buffer memory 330 may be a dynamic random access memory (DRAM), but example embodiments are not limited thereto. The buffer memory 330 may store data temporarily before the data is stored in the nonvolatile memory device 320. For example, data fetched from the host device (e.g., the host device 200 referring to FIG. 1) may first be stored in the buffer memory 330. Subsequently, the data stored in the buffer memory 330 may be assigned a physical address (e.g., the physical address PA referring to FIG. 1) of the nonvolatile memory device 320 and stored in the space pointed to by the physical address.

The buffer memory 330 may include or may be partitioned into first to n buffer regions BRG1 through BRGn. Each buffer region BRGi (where i is a natural number greater than 1 and less than or equal to n) may be managed by a i-th flash translation layer FTLi, respectively.

The storage controller 310 may include a scramble circuit SCR and a plurality of flash translation layers FTL (FTL1 through FTLn). Each of the plurality of flash translation layers FTL1 through FTLn may control a plurality of domains DM1 through DMn of the nonvolatile memory device 320 via corresponding channels (e.g., the channels CH). For example, the first flash translation layer FTL1 may control a corresponding first domain DM1. In an example embodiment, the first flash translation layer FTL1 may perform various maintenance operations for the first domain DM1, such as mapping table management, bad block management, wear leveling, and the like. The second flash translation layer FTL2 may control (e.g., may perform the various maintenance operations for) a corresponding second domain DM2, and in the same manner, a n-th flash translation layer FTLn may control a corresponding n-th domain DMn.

The scramble circuit SCR may assign a write request including a logical address LA from a host device (e.g., the host device 200 referring to FIG. 1) to the plurality of flash translation layers FTL1 through FTL4. For example, the logical address LA may refer to a logical block address LBA or logical page address LPA managed by the host device, and the host device may recognize and/or manage the storage regions in the storage device 300 based on the logical block address LBA. In an example embodiment, the logical block address LBA may be used by a file system (e.g., a portion of the operating system (OS)) of the host device to write and read data to and from the storage region of the storage device 300 in blocks of data. In an example embodiment, the scramble circuit SCR may assign write requests, i.e., the write operations corresponding to the write request, to the plurality of flash translation layers FTL1 through FTLn based on the logical address LA.

In example embodiments, the performance of the storage device 300 may not remain constant under various operating conditions or operating environments. The performance of the storage device 300 may refer to the amount of data per unit time transferred between the storage device 300 and the host device (e.g., the host device 200 referring to FIG. 1), the data transfer rate (speed), or the like. For example, depending on the physical characteristics of the nonvolatile memory device 320 or various environmental variables (e.g., the size of the buffer memory 330, the amount of available memory within the nonvolatile memory device 320, etc.), the time to complete operations for the same write request may vary. In particular, when a particular pattern of data is received, data may be skewed toward a particular channel among the plurality of channels (e.g., among the channels CH). This may cause performance fluctuations in the storage device 300, i.e., the storage device 300 may experience performance degradation due to uneven allocation of write requests to the plurality of resources, despite the need to maximize input/output (I/O) parallelism.

To provide uniform performance or maximum performance of the storage device 300, the scramble circuit SCR may perform address scramble for the logical addresses LAs. As described above, the address scramble may scramble the logical addresses LAs received from the host device (e.g., the host device 200 referring to FIG. 1) to generate scrambled logical addresses SLAs and assign corresponding requests based on the scrambled logical addresses SLAs to each of the plurality of flash translation layers FTL1 through FTLn. In an example embodiment, the address scramble may vary the order in which requests are assigned to the plurality of flash translation layers FTL1 through FTLn based on the logical address LA segments. In this case, the requests may be assigned relatively uniformly to the plurality of flash translation layers FTL1 through FTLn, and the sequentiality of the data may be maintained. Thus, the performance of the storage device 300 may be improved.

Figure 12:
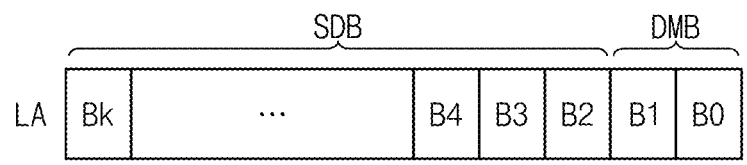
FIG. 12 is a diagram illustrating an example embodiment of address bit setting in a method of operating a storage device according to example embodiments.

FIG. 12 is a diagram illustrating an example embodiment of address bit setting in a method of operating a storage device according to example embodiments.

Referring to FIG. 12, a logical address LA provided by a host device (e.g., the host device 200 referring to FIG. 1) may include a plurality of address bits B0 through Bk. Herein, 'k' may be a natural number greater than 1. In one embodiment, the nonvolatile memory device (e.g., the nonvolatile memory device 320) may be partitioned into four domains (e.g., four domains DM). In this case, the two lower bits B0 and B1 may be set as domain bits DMB, and all higher bits B2 through Bk than the domain bits DMB may be set as seed bits SDB, as shown in FIG. 12.

Figure 13:
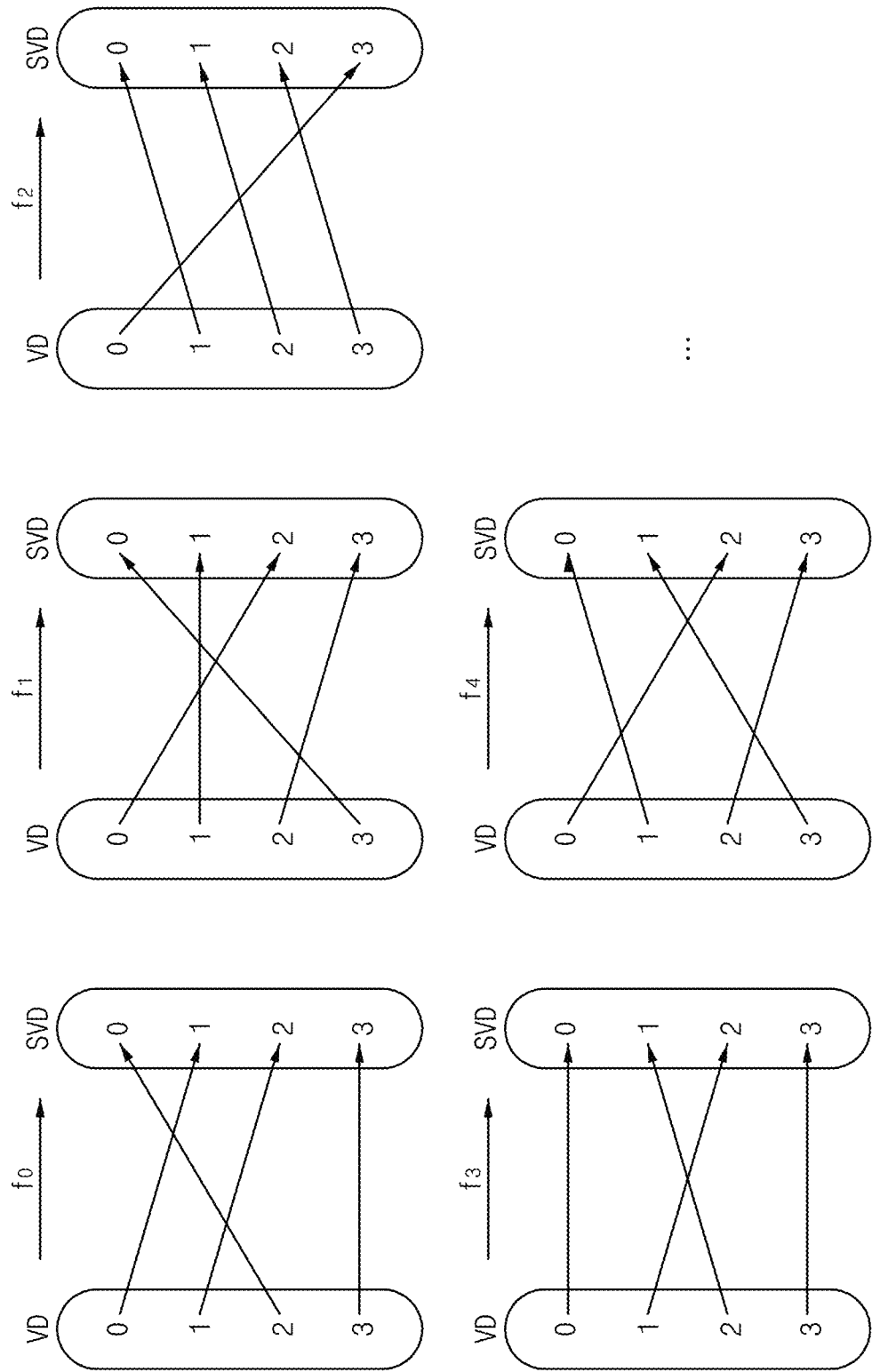
FIG. 13 is a diagram illustrating an example embodiment of scramble functions according to the address bit setting of FIG. 12.

FIG. 13 is a diagram illustrating an example embodiment of scramble functions according to the address bit setting of FIG. 12.

Referring to FIG. 13, each of the plurality of scramble functions f0 through f4 may be a one-to-one correspondence function with an inverse function as described with reference to FIG. 6. Five scramble functions f0 through f4 are shown in FIG. 13 as examples, but the number of scramble functions may be varied. In general, when the bit number of domain bits DMB is 's', at most $(2^s)!$ scramble functions may be present. Herein, 's' may be a natural number less than or equal to 'k'. For example, if the bit number of the domain bits DMB is 2, there may be up to $(2^2)!=4!=4 \times 3 \times 2 \times 1=24$ scramble functions.

As described with reference to FIG. 4, the scramble circuit SCR may determine the scramble function fi based on the seed value VS of the seed bits SDB corresponding to a portion of the plurality of address bits of the logical address LA provided from the host device 200.

Figure 15:
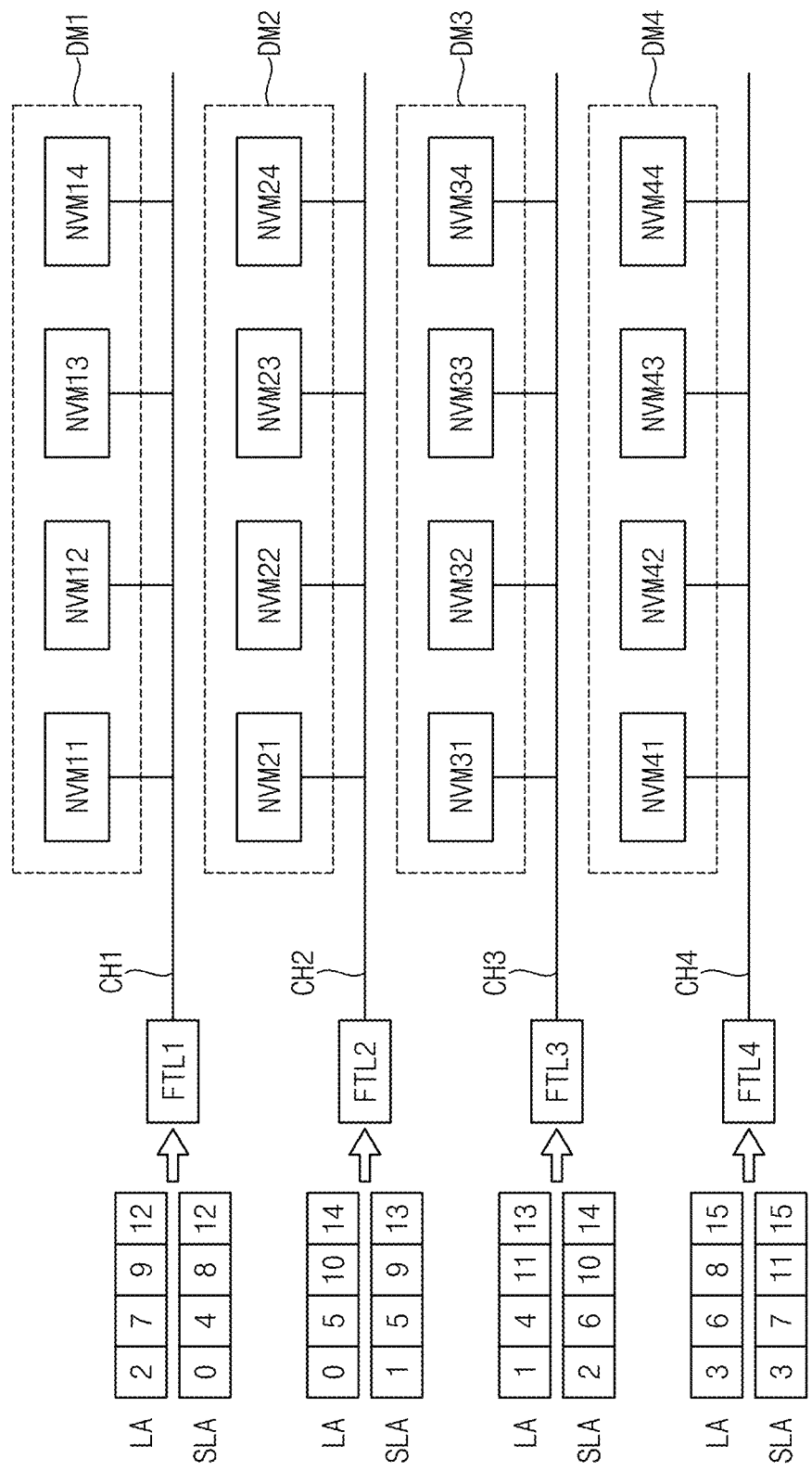
FIG. 15 is a diagram illustrating an example embodiment of a domain assignment according to the address scramble of FIG. 14.

FIG. 14 is a diagram illustrating an example embodiment of an address scramble using the address bit setting of FIG. 12 and the scramble functions of FIG. 13, and FIG. 15 is a diagram illustrating an example embodiment of a domain assignment according to the address scramble of FIG. 14.

Referring to FIG. 14, requests (e.g., requests REQ referring to FIG. 1) for write operations may be sequentially transmitted from a host device (e.g., the host device 200 referring to FIG. 1) to a storage device (e.g., the storage device 300) for sequential logical addresses LA, for example, LA=0 through LA=15. The scramble circuit SCR of FIG. 1 may determine one of the scramble functions f0 to f4 based on the seed value VS of each logical address LA as described above, and generate scrambled domain values SVD corresponding to each of the domain values VD based on or using the determined scramble function. FIG. 14 illustrates a correspondence of logical addresses LA=0 to LA=15 and scrambled logical addresses SLA=0 to SLA=15 according to such address scramble.

In FIG. 14, a unit range UR represents the set of $2^N$ logical addresses (e.g., the logical addresses LA) with the same seed value (e.g., the same seed value VS), where N is the bit number of the seed bits SDB. When N=2, each unit range UR includes 4 logical addresses, as shown in FIG. 14. The address scramble according to example embodiments may be referred to as a short-range scramble because it is performed by a scramble function (e.g., the scramble function fi) that is determined for each unit range UR.

The storage processor SPRC of FIG. 1 may assign write operations corresponding to logical addresses LA=0 to LA=15 to domains DM1 to DM4, respectively, based on the scrambled domain value SVD.

As a result, the write operations may be assigned to the corresponding domains as shown in FIG. 15. The write operations for logical addresses LA=2, 7, 9, and 12 corresponding to SVD=0 may be assigned to the first flash translation layer FTL1 to store write data (corresponding) to the first domain DM1. The write operations for logical addresses LA=0, 5, 10, and 14 corresponding to SVD=1 may be assigned to the second flash translation layer FTL2 to store the write data (corresponding) to the second domain DM2. The write operations for logical addresses LA=1, 4, 11, and 13 corresponding to SVD=2 may be assigned to the third flash translation layer FTL3 to store write data (corresponding) to the third domain DM3. The write operations for LA=3, 6, 8, and 15 corresponding to SVD=3 may be assigned to the fourth Flash Translation Layer FTL4 to store write data (corresponding) to the fourth domain DM4.

Figure 16:
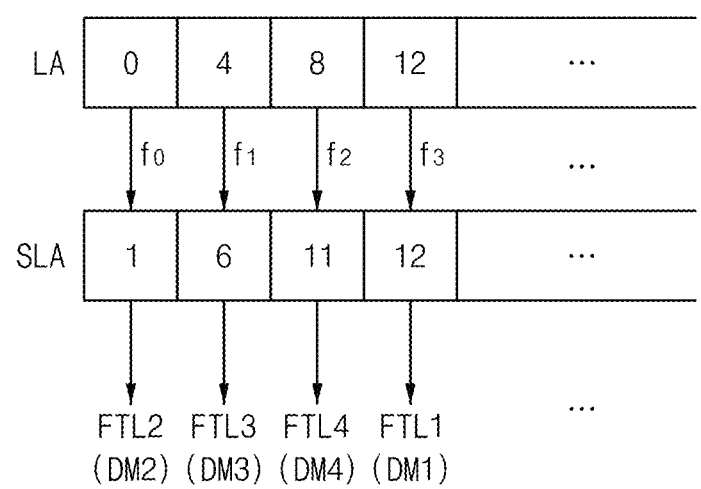
FIG. 16 is a diagram illustrating an example embodiment of an address scramble using the address bit setting of FIG. 12 and the scramble functions of FIG. 13.

FIG. 16 is a diagram illustrating an example embodiment of an address scramble using the address bit setting of FIG. 12 and the scramble functions of FIG. 13.

Referring to FIG. 16, requests for write operations may be sent sequentially from the host device (e.g., the host device 200 referring to FIG. 1) to the storage device (e.g., the storage device 300) for a particular pattern of logical addresses LA, e.g., logical addresses LA corresponding to multiples of 4, such as LA=0, LA=4, LA=8, and LA=12.

For this particular address pattern, conventionally, the write operations are crowded into one of the first through fourth flash translation layers FTL1 through FTL4, thereby reducing the endurance and performance of the nonvolatile memory device (e.g., the nonvolatile memory device 320). In contrast, according to example embodiments, write operations with specific address patterns may be distributed among the first to fourth flash translation layers FTL1 to FTL4 via the address scramble described with reference to FIGS. 12 through 15, and write data may be distributed and stored in the first to fourth domains DM1 to DM4. By distributing the write operations, parallel processing of data input and output (I/O) may be efficiently supported.

As such, the storage device (e.g., the storage device 300) and the operation method of the storage device according to example embodiments may prevent input and output I/O from being crowded into a particular domain through a two-stage address scramble that determines the scramble function (e.g., the scramble function fi) based on the seed value (e.g., the seed value VS) of the logical address (e.g., the logic address LA) and scrambles the domain value (e.g., the domain value VD) of the logical address based on the scramble function.

Figure 17:
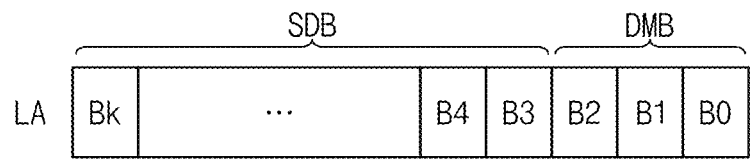
FIG. 17 is a diagram illustrating example embodiments of address bit setting in a method of operating a storage device according to example embodiments.
Figure 18:
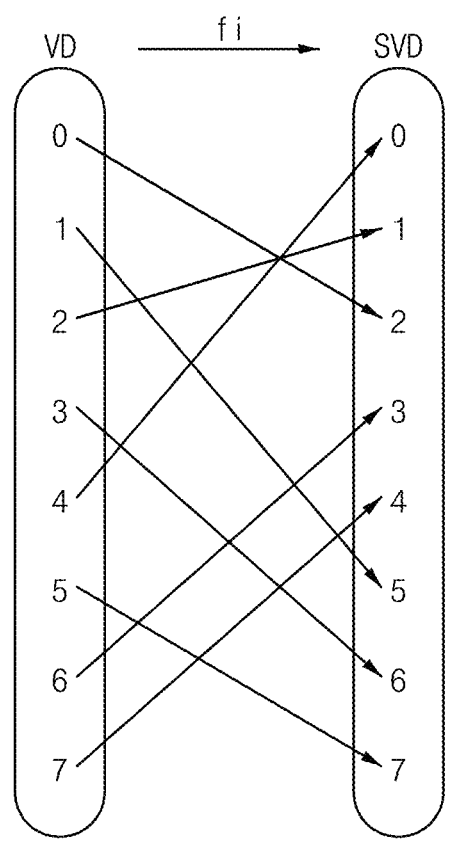
FIG. 18 is a diagram illustrating an example embodiment of scramble functions according to the address bit setting of FIG. 17.

FIG. 17 is a diagram illustrating example embodiments of address bit setting in a method of operating a storage device according to example embodiments, and FIG. 18 is a diagram illustrating an example embodiment of scramble functions according to the address bit setting of FIG. 17.

Referring to FIG. 17, a logical address LA provided by a host device (e.g., the host device 200 referring to FIG. 1) may include a plurality of address bits B0 through Bk. In one embodiment, the nonvolatile memory device (e.g., the nonvolatile memory device 320) may be partitioned into eight domains. In this case, the three lower bits B0, B1, and B2 may be set as domain bits DMB, and all higher bits B3 through Bk than the domain bits DMB may be set as seed bits SDB, as shown in FIG. 17.

Referring to FIG. 18, each of the scramble functions fi may be a one-to-one correspondence function for which an inverse function exists as described with reference to FIG. 6. FIG. 18 illustrates an example scramble function fi corresponding to one one-to-one correspondence. When the bit number of the domain bits DMB is 3, there may be up to $(2^3)!=8!=8\times7\times6\times5\times4\times3\times2\times1=40320$ scramble functions.

Figure 19:
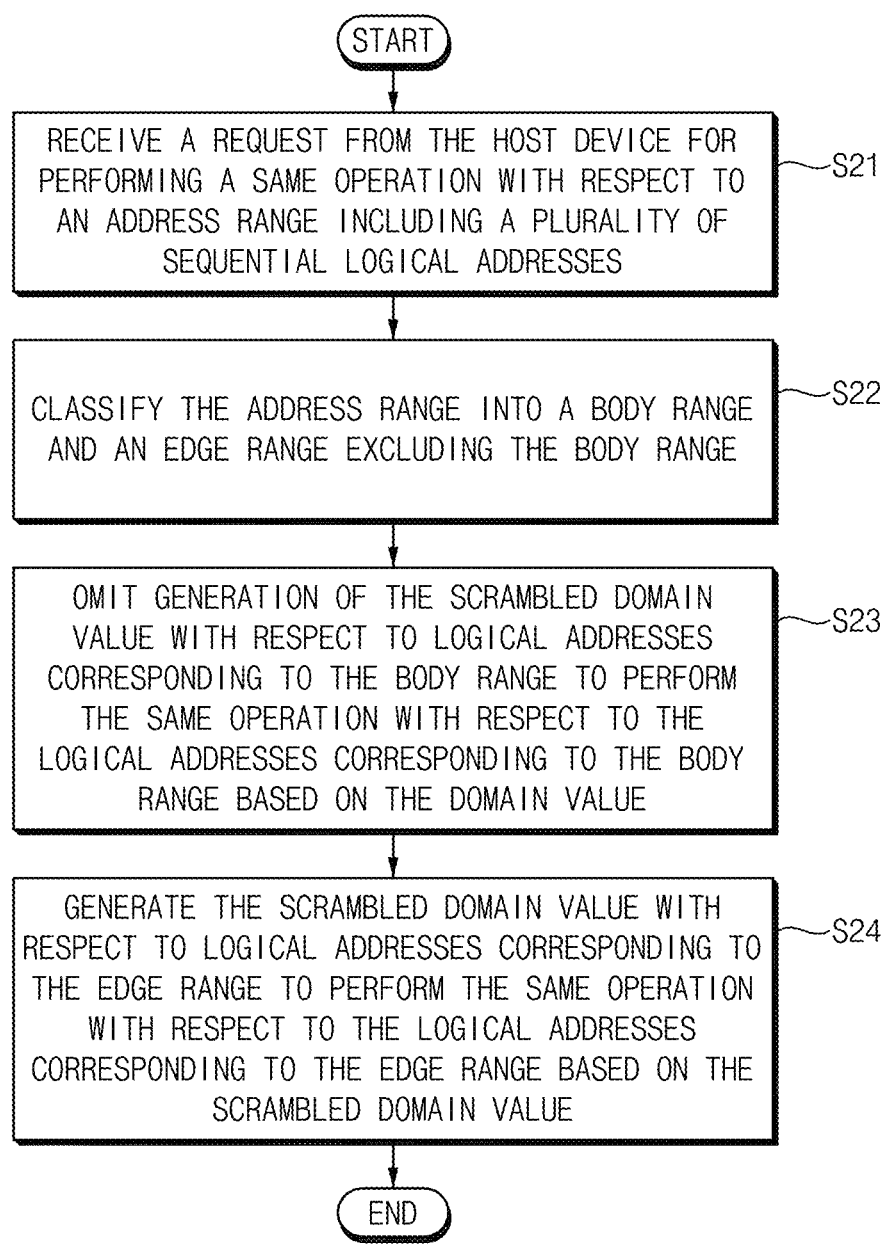
FIG. 19 is a flowchart illustrating a method of operating a storage device according to example embodiments.
Figure 20:
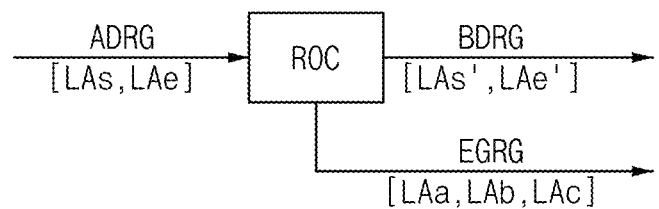
FIG. 20 is a diagram illustrating an example embodiment of a range operation controller included in a storage device according to example embodiments.

FIG. 19 is a flowchart illustrating a method of operating a storage device according to example embodiments, and FIG. 20 is a diagram illustrating an example embodiment of a range operation controller included in a storage device according to example embodiments.

Figure 21:
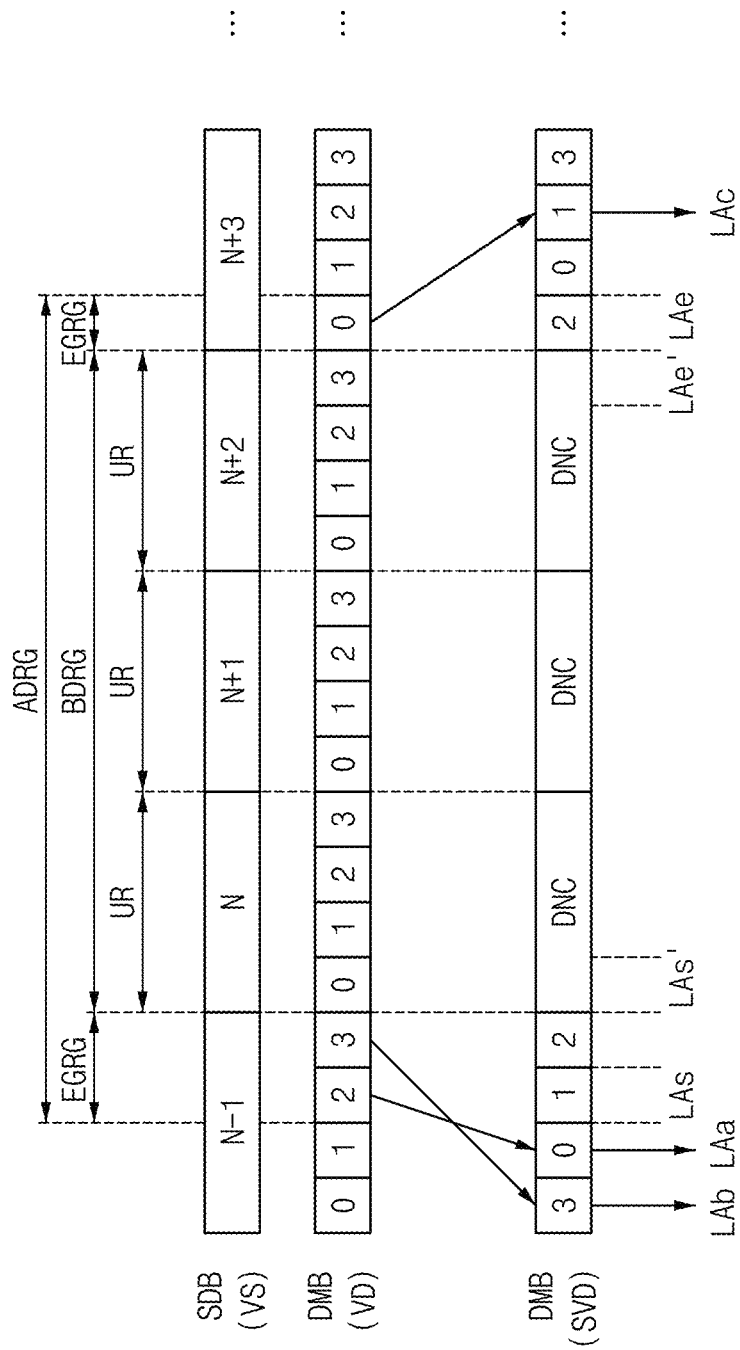
FIG. 21 is a diagram for describing operations of the range operation controller of FIG. 20.

Referring to FIGS. 1, 19 and 20, the storage controller 310 may receive a request REQ from the host device 200 to perform a same operation for an address range ADRG including a plurality of sequential logical addresses LA (S21). For example, as shown in FIGS. 20 and 21, the address range ADRG may be represented by a start logical address LAs and an end logical address LAe. In some embodiments, the address range ADRG may be provided by the host device 200 in the form of the starting addresses LAs and the size or length of the address range ADRG.

The range operation controller ROC included in the storage controller 310 may classify the address range ADRG into a body range BDRG and an edge range EGRG excluding the body range BDRG (S22). For example, the body range BDRG may be represented by the start logical address LAs' and the end logical address LAe', and the edge range EGRG may be represented by the respective logical addresses LAa, LAb and LAc.

Here, the body range BDRG may include (e.g., may be composed of) unit ranges UR each containing $2^N$ logical addresses with the same seed value VS, where N is the bit number of the seed bits SDB. For example, when N=2, each unit range UR contains 4 logical addresses with the same seed value VS.

The storage controller 310 may omit generation of the scrambled domain value SVD for the logical addresses (e.g., the logical addresses LA) corresponding to the body range BDRG and perform the same operation based on the domain value VD for the logical addresses corresponding to the body range BDRG (S23).

On the other hand, the storage controller 310 may generate the scrambled domain value SVD for the logical addresses (e.g., the logical addresses LA) corresponding to the edge range EGRG and perform the same operation based on the scrambled domain value SVD for the logical addresses corresponding to the edge range EGRG (S24). In some embodiments, the range operation controller ROC may provide logical addresses corresponding to the body range BDRG to a processor (e.g., the scramble circuit SCR) and may provide scrambled logical addresses corresponding to the edge range EGRG to the processor by replacing the domain value VD with the scrambled domain value SVD.

FIG. 21 is a diagram for describing operations of the range operation controller of FIG. 20.

FIG. 21 illustrates a seed value VS of seed bits SDB, a domain value VD of domain bits DMB, and a scrambled domain value SVD of domain bits DMB for an example address range ADRG.

The address range ADRG may include the logical addresses LA between the start logical address LAs and the end logical address LAe. In the example of FIG. 21, the start logical address LAs of the address range ADRG correspond to (N−1)+2 and the end logical address LAe of the address range ADRG correspond to (N+3).

The body range BDRG may include all unit ranges UR within the address range ADRG. The body range BDRG may include the logical addresses LA between the start logical address LAs and the end logical address LAe. In the example of FIG. 21, the start logical address LAs' of the body range BDRG corresponds to N and the end logical address LAe' of the body range BDRG corresponds to (N+2)+3.

The edge range EGRG may correspond to the remainder of the address range ADRG except for the body range BDRG. In the example of FIG. 21, the edge range EGRG contains three logical addresses LAa, LAb, and LAc. LAa corresponds to (N−1)+2, LAb corresponds to (N−1)+3, and LAc corresponds to (N+3).

In FIG. 21, DNC indicates "don't care", i.e., no address scramble is required. The same operation may be performed for all address ranges ADRG. The same operation may be performed sequentially for the four logical addresses LA in each unit range UR, and no address scramble may be required.

On the other hand, for the logical addresses LAa, Lab, and LAc corresponding to the edge region EGRG, an address scramble may be performed to generate the corresponding scrambled domain values SVD, and the same operation may be performed for the scrambled logical addresses (e.g., scrambled logical addresses SLA) with generated scrambled domain values SVD that replace the domain values VD of the logical addresses LAa, Lab, and LAc, respectively.

For the body range BDRG that may be sequentially processed, a sequential access operation that has a fast operation speed and can be processed in chunks, such as memset, may be performed, and for the edge range EGRG excluding the body range BDRG, a random access operation may be performed by scrambling the addresses (e.g., the logical addresses LA) using a scramble circuit SCR.

As such, a storage device (e.g., the storage device 300) and an operation method of the storage device according to example embodiments may efficiently support (e.g., enable) the above-mentioned range operation by selectively performing address scramble by classifying the address range ADRG into the body range BDRG and the edge range EGRG in the case of the range operation that performs the same operation for the address range ADRG.

Figure 22:
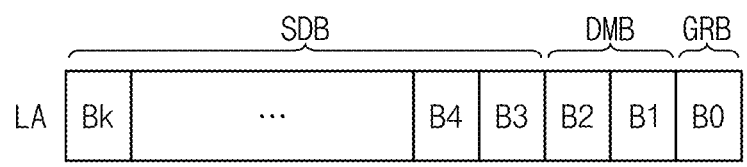
FIG. 22 is a diagram illustrating an example embodiment of address bit setting in a method of operating a storage device according to example embodiments.
Figures 23, 24:
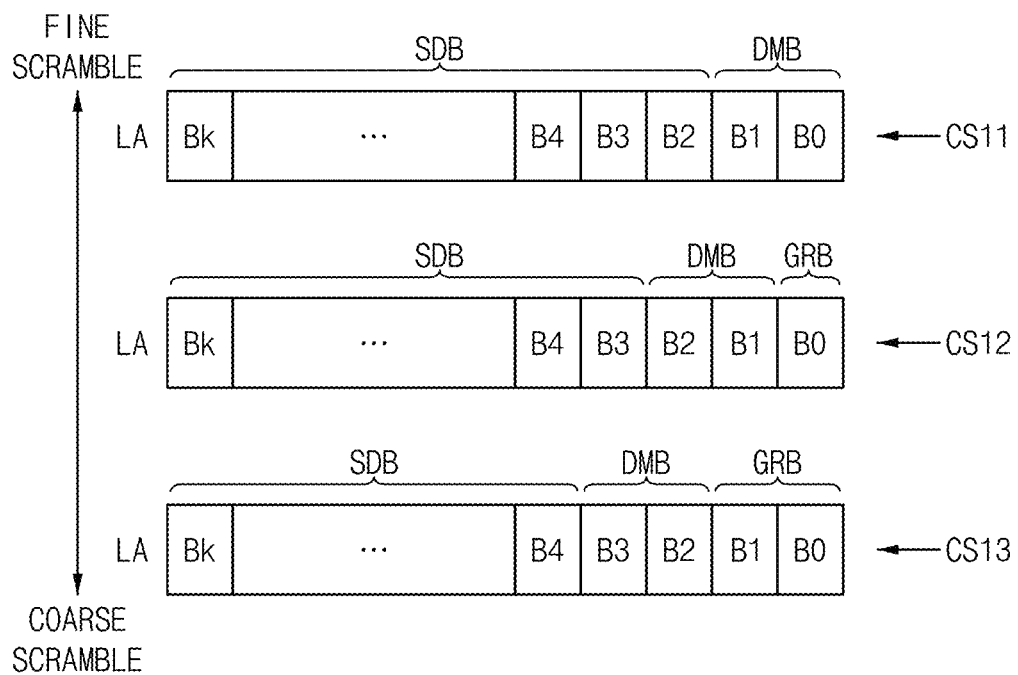
FIG. 23 is a diagram illustrating an example embodiment of an address scramble using the address bit setting of FIG. 22 and the scramble functions of FIG. 13.
FIG. 24 is a diagram illustrating example embodiments of adjusting a bit number of granularity bits in a method of operating a storage device according to example embodiments.

FIG. 22 is a diagram illustrating an example embodiment of address bit setting in a method of operating a storage device according to example embodiments, and FIG. 23 is a diagram illustrating an example embodiment of an address scramble using the address bit setting of FIG. 22 and the scramble functions of FIG. 13.

Referring to FIG. 22, a logical address LA provided by a host device (e.g., the host device 200 referring to FIG. 1) may include a plurality of address bits B0 through Bk. In one embodiment, the nonvolatile memory device (e.g., the nonvolatile memory device 320) may be partitioned into four domains. In this case, the least significant bit B0 (e.g., the least significant bit LSB) may be set as a granularity bit GRB, two bits B1, B2 (adjacent to the granularity bit GRB) may be set as domain bits DMB, and all higher bits B3 through Bk than the domain bits DMB may be set as seed bits SDB, as shown in FIG. 22.

Referring to FIG. 23, requests (e.g., the requests REQ) for write operations may be sequentially transmitted from the host device (e.g., the host device 200 referring to FIG. 1) to the storage device (e.g., the storage device 300) for sequential logical addresses LA, i.e., LA=0 through LA=15. The scramble circuit SCR of FIG. 1 may determine one of the scramble functions f0 and f1 based on the seed value VS of each logical address LA as described above, and generate scrambled domain values SVD corresponding to each of the domain values VD in the determined scramble function (e.g., corresponding to a calculation of each of the domain values VD by the determined scramble function). FIG. 23 illustrates the correspondence of logical addresses LA=0 to LA=15 and scrambled logical addresses SLA=0 to SLA=15 according to such address scramble.

The domain value VD of the domain bits DMB may be independent of the granularity bit GRB corresponding to the least significant bit. Therefore, as shown in FIG. 23, two sequential (adjacent) logical addresses LA may be paired to have the same scrambled domain value SVD. As a result, the corresponding write operations for two sequential logical addresses may be assigned to the same domain.

In FIG. 23, the unit range UR represents the set of $2^{N+M}$ logical addresses LA with the same seed value VS, where N is the bit number of the seed bits SDB and M is the bit number of the granularity bits GRB. For N=2 and M=1, each unit range UR contains 8 logical addresses LA, as shown in FIG. 23. The corresponding write operations for $2^M$ sequential logical addresses LA may be assigned to the same domain.

FIG. 24 is a diagram illustrating example embodiments of adjusting a bit number of granularity bits in a method of operating a storage device according to example embodiments.

The first case CS11 illustrates a case of not setting the granularity bits GRB, the second case CS12 illustrates a case of setting the granularity bits GRB of one bit B0, and the third case CS13 illustrates a case of setting the granularity bits GRB of two bits B0 and B1.

In the first case CS11, as described with reference to FIGS. 12 through 15, an address scramble may be performed on the basis of one logical address LA in each unit range UR, such that the logical addresses LA in each unit range UR may be assigned to different domains.

In the second case CS12, as described with reference to FIGS. 22 and 23, an address scramble may be performed in units of two logical addresses LA in each unit range UR such that two sequential (adjacent) logical addresses LA in each unit range UR may be assigned to the same domain, respectively.

In a third case CS13, which is not illustrated with reference to the drawings, an address scramble may be performed in units of four logical addresses LA in each unit range UR such that four sequential (adjacent) logical addresses LA in each unit range UR may be assigned to the same domain.

As a result, a finer scramble may be performed by decreasing the bit number of the granularity bits GRB, and a coarser scramble may be performed by increasing the bit number of the granularity bits GRB.

Figure 25:
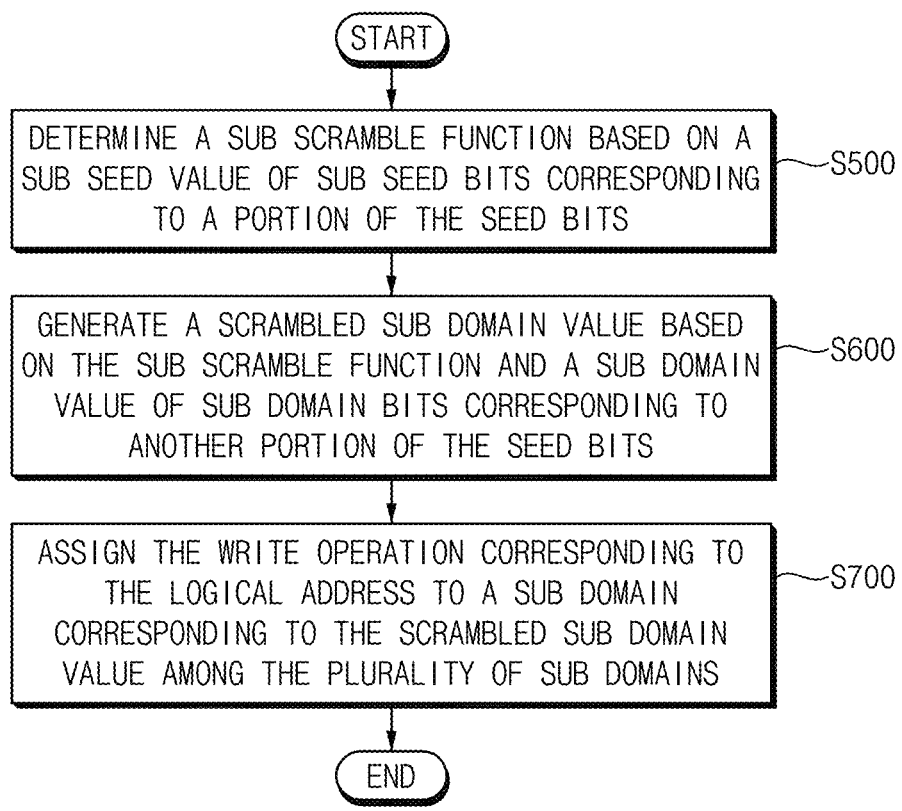
FIG. 25 is a flowchart illustrating a method of operating a storage device according to example embodiments.
Figure 26:
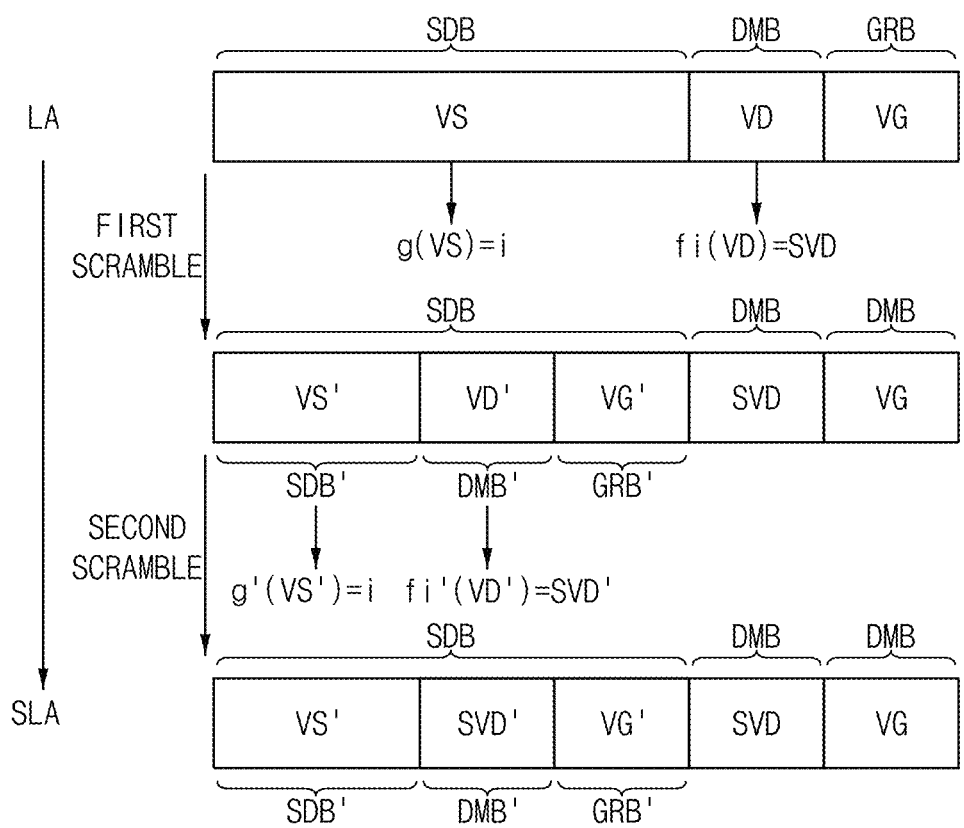
FIG. 26 is a diagram illustrating an example embodiment of an address scramble in a method of operating a storage device according to example embodiments.

FIG. 25 is a flowchart illustrating a method of operating a storage device according to example embodiments, and FIG. 26 is a diagram illustrating an example embodiment of an address scramble in a method of operating a storage device according to example embodiments.

Referring to FIGS. 1, 25, and 26, the scramble circuit SCR may determine a sub scramble function fi' based on a sub seed value VS' of the sub seed bits SDB' corresponding to a portion of the seed bits SDB (S500).

The scramble circuit SCR may generate a scrambled sub domain value SVD' based on the sub scramble function fi' and the sub domain value VD' of the sub domain bits DMB' corresponding to another portion of the seed bits SDB (S60).

The processes S200 and S300 of FIG. 2 may be referred to as a first scramble, and the processes S500 and S600 of FIG. 25 may be referred to as a second scramble. The scramble circuit SCR may perform the second scramble corresponding to the processes S500 and S600 of FIG. 25 after the first scramble corresponding to the processes S200 and S300 of FIG. 2 are completed, as shown in FIG. 26.

Based on the scrambled sub domain value VD', the storage processor SPCR may assign a write operation corresponding to the logical address LA to a sub domain corresponding to the scrambled sub domain value VD' among the plurality of sub domains.

Referring to FIG. 26, the address bits of the logical address LA may be set to the granularity bits GRB, the domain bits DMB, and the seed bits SDB. As described with reference to FIG. 4, the scramble circuit SCR may determine a scramble function fi based on the seed value VS of the seed bits SDB, and perform a first scramble to generate a scrambled domain value SVD based on the domain value VD of the domain bits DMB and the scramble function fi.

Further, the seed bits SDB may be set to sub granularity bits GRB', sub domain bits DMB', and sub seed bits SDB'. In a similar manner to the first scramble, the scramble circuit SCR may perform a second scramble to determine a sub scramble function fi' based on the sub seed value VS' of the sub seed bits SDB' and generate a scrambled sub domain value SVD' based on the sub domain value VD' of the sub domain bits DMB' and the sub scramble function fi'.

For example, in the case of the structure of the nonvolatile memory device as will be described below with reference to FIG. 32, the domains may be partitioned on a channel-by-channel basis, and the sub domains may be partitioned on a way-by-way basis for each channel. As such, when hierarchically partitioning the storage region of the nonvolatile memory device, a multiple address scramble as described with reference to FIGS. 25 and 26 may be performed to further enhance address distribution.

Figure 27:
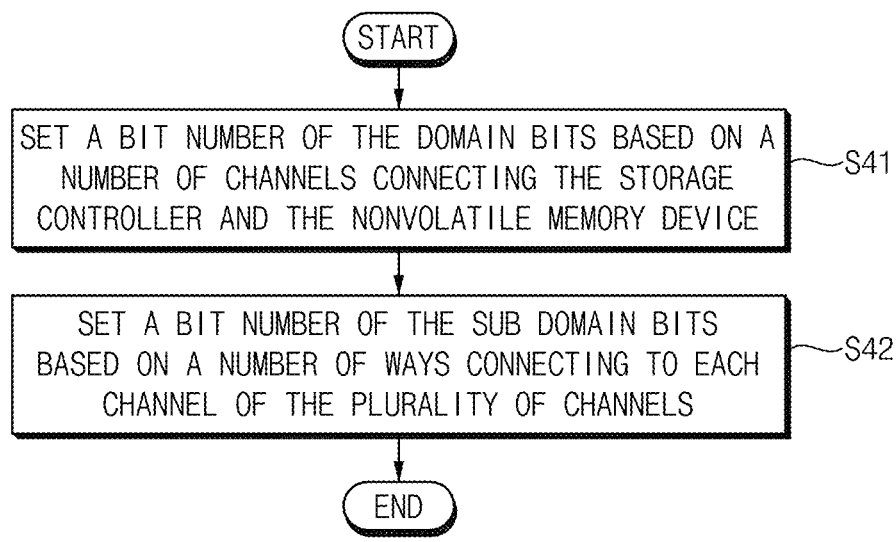
FIG. 27 is a flowchart illustrating an example embodiment of address bit setting in a method of operating a storage device according to example embodiments.

FIG. 27 is a flowchart illustrating an example embodiment of address bit setting in a method of operating a storage device according to example embodiments.

Referring to FIG. 27, the bit number of the domain bits (e.g., the domain bits DMB) may be set based on the number of the plurality of channels connecting (e.g., electrically connecting) the storage controller (e.g., the storage controller 310) and the nonvolatile memory device (e.g., the nonvolatile memory device 320) (S41). In one embodiment, as described with reference to FIGS. 7 and 8, one domain may be set per one channel. In another embodiment, as described with reference to FIGS. 9 and 10, one domain may be set per two or more channels.

The bit number of the sub domain bits (e.g., the sub domain bits DMB') may be set based on the number of ways connected (e.g., electrically connected) to each channel of the plurality of channels (S42). According to embodiments, one sub domain may be set per one way, and one sub domain may be set per two or more channels.

Figure 28:
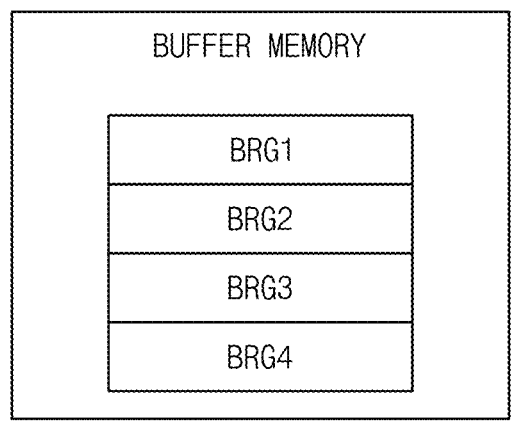
FIGS. 28 and 29 are diagrams illustrating example embodiments of setting a buffer memory in a method of operating a storage device according to example embodiments.
Figure 29:
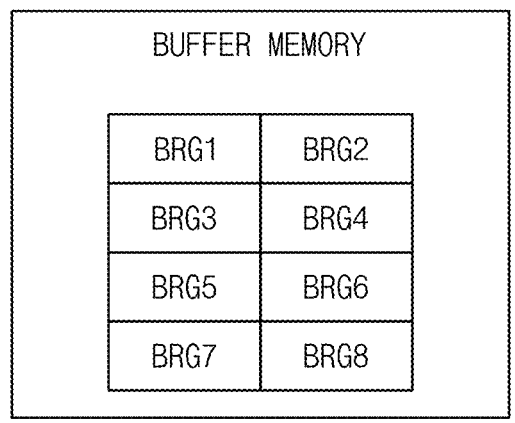

FIGS. 28 and 29 are diagrams illustrating example embodiments of setting a buffer memory in a method of operating a storage device according to example embodiments.

Referring to FIGS. 28 and 29, the buffer memory (e.g., the buffer memory 330) may include a plurality of buffer regions, each buffer region BRGi, wherein 'i' is a natural number greater than 1 and less than or equal to 'n', may be managed by an i-th flash translation layer FTLi, respectively. FIG. 28 illustrates an example that the nonvolatile memory device (e.g., the nonvolatile memory device 320) includes four buffer regions BRG1 through BRG4 corresponding to four domains (e.g., the first domain DM1 through the fourth domain DM4), and FIG. 29 illustrates an example that the nonvolatile memory device includes eight buffer regions BRG1 through BRG8 corresponding to eight domains (e.g., the first domain DM1 through the eights domain DM8).

In one embodiment, the bit number of the granularity bits GRB described above may be set based on the capacity of the buffer memory and the number of plurality of domains included in the nonvolatile memory device. For example, when the buffer memories of FIGS. 28 and 29 have the same capacity, the amount of data that may be buffered by each buffer region BRGi may decrease as the number of the plurality of domains increases. Therefore, the bit number of the granularity bits GRB may be decreased as the number of the plurality of domains increases, i.e., the bit number of the granularity bits GRB corresponding to FIG. 29 may be set to be smaller than the bit number of the granularity bits GRB corresponding to FIG. 28. On the other hand, the bit number of the granularity bits GRB may be increased as the capacity of the buffer memory increases. As such, by setting the bit number of the granularity bits GRB appropriate to the hardware resource, such as the number of channels of the nonvolatile memory device, the capacity of the buffer memory, and the like, the data input/output parallel processing may be efficiently supported.

Figure 30:
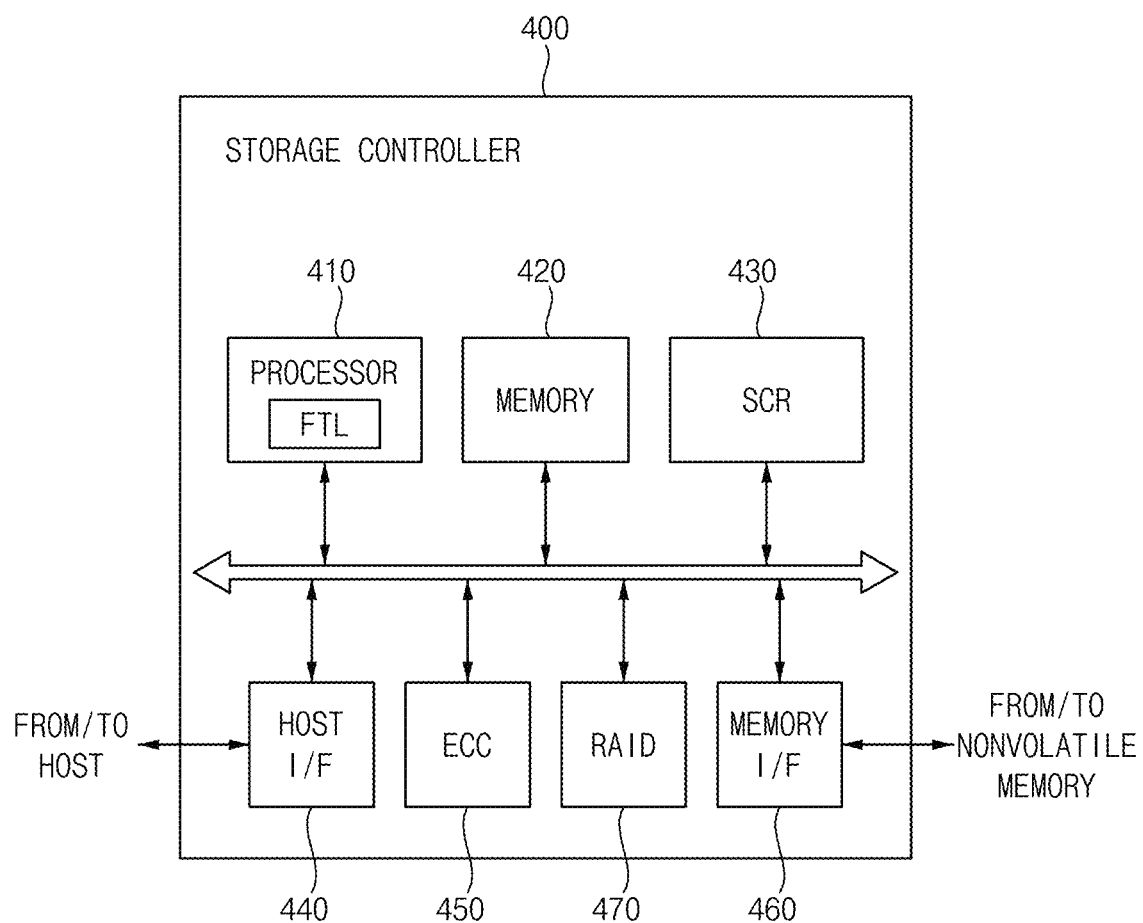
FIG. 30 is a block diagram illustrating an example embodiment of a storage controller included in a storage device according to example embodiments.

FIG. 30 is a block diagram illustrating an example embodiment of a storage controller included in a storage device according to example embodiments.

Referring to FIG. 30, a storage controller 400 may include a processor 410, a memory 420, a scramble circuit 430, a host interface (I/F) 440, an error correction code (ECC) engine 450, a memory interface (I/F) 460 and a RAID controller 470. In some embodiments, the storage controller 400, the processor 410, and the scramble circuit 430 may correspond to the storage controller 310, the storage processor SPRC, and the scramble circuit SCR in FIG. 1, respectively.

The processor 410 may control an operation of the storage controller 400 in response to requests received via the host interface 440 from a host device (e.g., the host device 200 in FIG. 1). For example, the processor 410 may control an operation of a storage device (e.g., the storage device 300 in FIG. 1), and may control respective components by employing firmware for operating the storage device. The processor 410 may include the flash translation layer FTL that may operates in units of domains as described above.

The memory 420 may store instructions and data executed and processed by the processor 410. For example, the memory 420 may include (may be implemented with) a volatile memory, such as a DRAM, a SRAM, a cache memory, or the like.

The scramble circuit 430 may perform the address scramble as described above. According to example embodiments, the scramble circuit 430 may include (may be implemented as) hardware, software, and/or firmware.

An ECC engine 450 for error correction may perform coded modulation using, for example, a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 440 may provide physical connections (and/or electrical connections) between the host device and the storage device. The host interface 440 may provide an interface corresponding to a bus format of the host device for communication between the host device and the storage device. In some example embodiments, the bus format of the host device may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), a SATA, a nonvolatile memory (NVM) express (NVMe), etc., format.

The memory interface 460 may communicate data with a nonvolatile memory device (e.g., the nonvolatile memory device 320 referring to FIG. 1). The memory interface 460 may transfer data to the nonvolatile memory device or may receive data read from the nonvolatile memory device. In some example embodiments, the memory interface 460 may be connected (e.g., electrically connected) to the nonvolatile memory device via one channel. In other example embodiments, the memory interface 460 may be connected (e.g., electrically connected) to the nonvolatile memory device via two or more channels. For example, the memory interface 460 may be configured to comply with a standard protocol, such as Toggle or open NAND flash interface (ONFI).

The RAID controller 470 may be implemented to perform a conventional RAID recovery function. The RAID controller 470 may also be implemented to perform the indirect read operation according to example embodiments.

The storage controller 400 may include an Advanced Encryption Standard (AES) engine. The AES engine may perform at least one of an encryption operation and a decryption operation on data input to the storage controller 400 using a symmetric-key algorithm.

Figure 31:
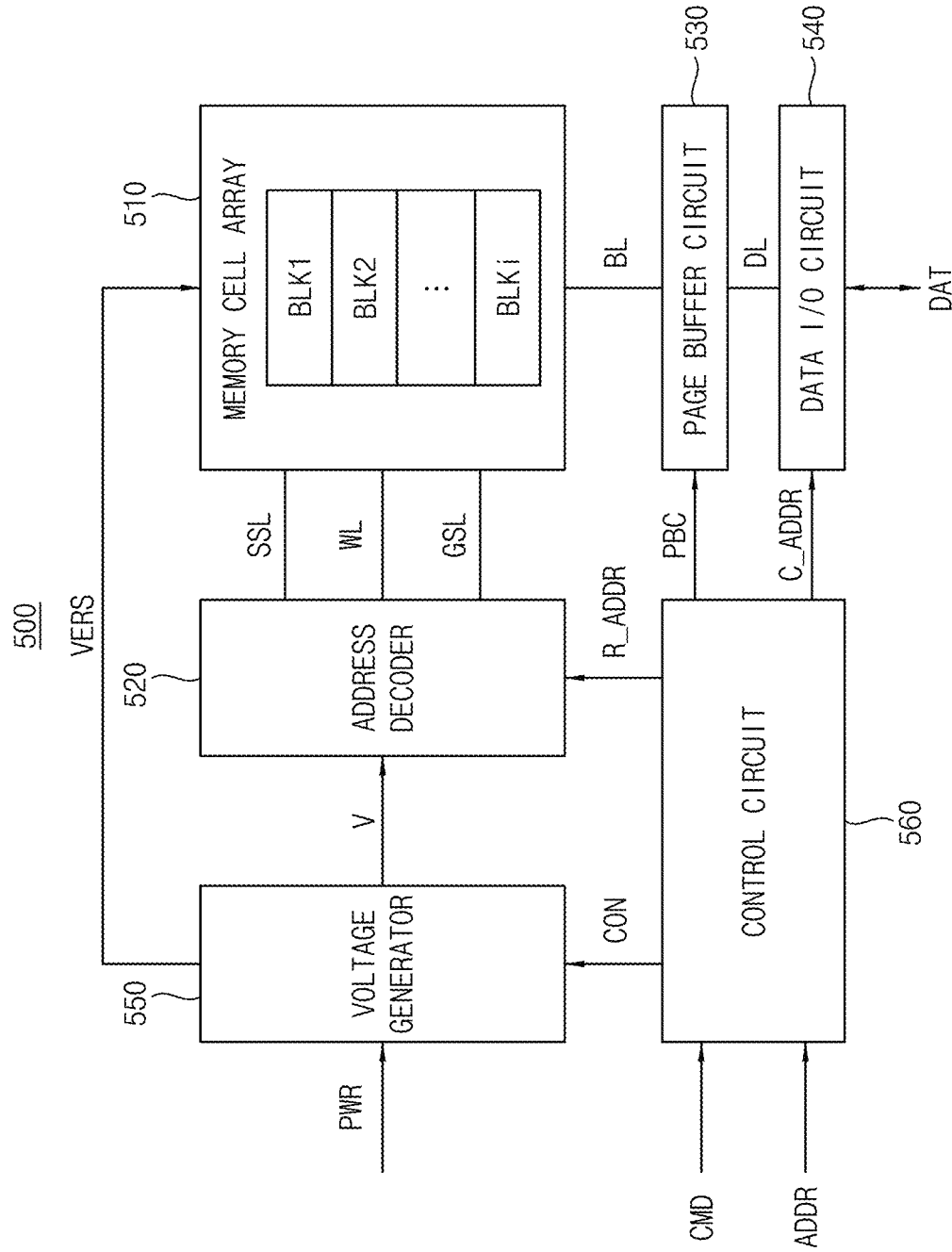
FIG. 31 is a block diagram illustrating a nonvolatile memory device included in a storage device according to example embodiments.

FIG. 31 is a block diagram illustrating a nonvolatile memory device included in a storage device according to example embodiments.

Referring to FIG. 31, a nonvolatile memory 500 may include a memory cell array 510, an address decoder 520, a page buffer circuit 530, a data I/O circuit 540, a voltage generator 550, and a control circuit 560. In some embodiments, the nonvolatile memory 500 may correspond to the nonvolatile memory device 320 referring to FIG. 1.

The memory cell array 510 may be connected (e.g., electrically connected) to the address decoder 520 via a plurality of string selection lines SSL, a plurality of wordlines WL, and a plurality of ground selection lines GSL. The memory cell array 510 may be further connected (e.g., electrically connected) to the page buffer circuit 530 via a plurality of bitlines BL. The memory cell array 510 may include a plurality of memory cells (e.g., a plurality of nonvolatile memory cells) that are connected (e.g., electrically connected) to the plurality of wordlines WL and the plurality of bitlines BL. The memory cell array 510 may be divided into a plurality of memory blocks BLK1, BLK2, . . . , BLKi, each of which includes memory cells. In addition, each of the plurality of memory blocks BLK1, BLK2, . . . , BLKi may be divided into a plurality of pages.

In some example embodiments, the plurality of memory cells included in the memory cell array 510 may be arranged in a two-dimensional (2D) array structure or a three-dimensional (3D) vertical array structure. The memory cell array of the 3D vertical array structure will be described below with reference to FIG. 33.

The control circuit 560 may receive a command CMD and an address ADDR from an outside (e.g., from the storage controller 310 in FIG. 1), and control erasure, programming and read operations of the nonvolatile memory 500 based on the command CMD and the address ADDR. An erasure operation may include performing a sequence of erase loops, and a programming operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, and may generate a control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected (e.g., electrically connected) to the memory cell array 510 via the plurality of string selection lines SSL, the plurality of wordlines WL and the plurality of ground selection lines GSL.

For example, in the data erase/write/read operations, the address decoder 520 may determine at least one of the plurality of wordlines WL as a selected wordline, and may determine the remaining wordlines, other than the selected wordline, as unselected wordlines, based on the row address R_ADDR.

In addition, in the data erase/write/read operations, the address decoder 520 may determine at least one of the plurality of string selection lines SSL as a selected string selection line, and may determine the remaining string selection lines, other than the selected string selection line, as unselected string selection lines, based on the row address R_ADDR.

Further, in the data erase/write/read operations, the address decoder 520 may determine at least one of the plurality of ground selection lines GSL as a selected ground selection line, and may determine the remaining ground selection lines, other than the selected ground selection line, as unselected ground selection lines, based on the row address R_ADDR.

The voltage generator 550 may generate voltages V that are required for an operation of the nonvolatile memory 500 based on a power PWR and the control signals CON. The voltages V may be applied to the plurality of string selection lines SSL, the plurality of wordlines WL, and the plurality of ground selection lines GSL via the address decoder 520. In addition, the voltage generator 550 may generate an erase voltage (an erase voltage VERS) that is required for the data erase operation based on the power PWR and the control signals CON. The erase voltage may be applied to the memory cell array 510 directly or via the bitline BL.

For example, during the erase operation, the voltage generator 550 may apply the erase voltage to a common source line and/or the bitline BL of a memory block (e.g., a selected memory block) and may apply an erase permission voltage (e.g., a ground voltage) to all wordlines of the memory block or a portion of the wordlines via the address decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520.

The page buffer circuit 530 may be connected (e.g., electrically connected) to the memory cell array 510 via the plurality of bitlines BL. The page buffer circuit 530 may include a plurality of page buffers. In some example embodiments, each page buffer may be connected (e.g., electrically connected) to one bitline. In other example embodiments, each page buffer may be connected (e.g., electrically connected) to two or more bitlines.

The page buffer circuit 530 may store data DAT to be programmed into the memory cell array 510 or may read data DAT sensed (e.g., read) from the memory cell array 510. In other words, the page buffer circuit 530 may operate as a write driver or a sensing amplifier according to an operation mode of the nonvolatile memory 500.

The data I/O circuit 540 may be connected (e.g., electrically connected) to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR. As used hereinafter, the terms "external/outside configuration", "external/outside device", "external/outside power", "external/outside signal", or "outside" are intended to broadly refer to a device, circuit, block, module, power, and/or signal that resides externally (e.g., outside of a functional or physical boundary) with respect to a given circuit, block, module, system, or device.

Although the nonvolatile memory is described based on a NAND flash memory, example embodiments are not limited thereto, and the nonvolatile memory may be any nonvolatile memory, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

Figure 32:
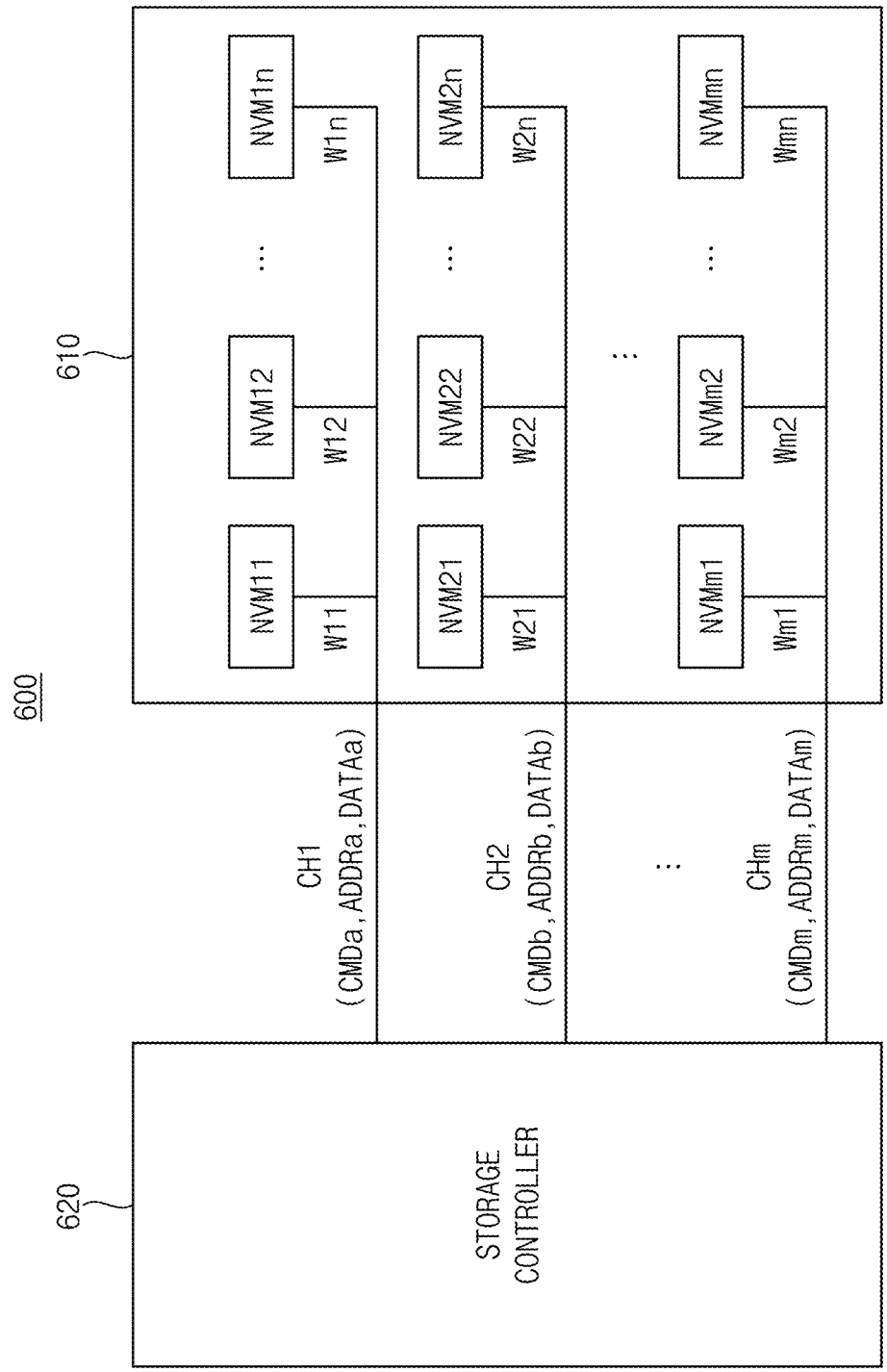
FIG. 32 is a block diagram illustrating a storage device according to example embodiments.

FIG. 32 is a block diagram illustrating a storage device according to example embodiments.

Referring to FIG. 32, a storage device 600 may include a memory device 610 and a storage controller 620. The storage device 600, the memory device 610, and the storage controller 620 may correspond to the storage device 300, the nonvolatile memory device 320, and the storage controller 310 of FIG. 1, respectively. The storage device 600 may support a plurality of channels CH1, CH2, . . . , CHm, and the memory device 610 may be connected (e.g., electrically connected) to the storage controller 620 through the plurality of channels CH1 to CHm. For example, the storage device 600 may be implemented as a storage device, such as a universal flash storage (UFS), a solid state drive (SSD), or the like.

The memory device 610 may include a plurality of nonvolatile memories NVM11, NVM12, . . . , NVM1n, NVM21, NVM22, . . . , NVM2n, NVMm1, NVMm2, . . . , NVMmn. Each of the nonvolatile memories NVM11 to NVMmn may be connected (e.g., electrically connected) to one of the plurality of channels CH1 to CHm through a way (a way W11 to Wmn) corresponding thereto. For instance, the nonvolatile memories NVM11 to NVM1n may be connected (e.g., electrically connected) to the first channel CH1 through ways W11, W12, . . . , W1n, the nonvolatile memories NVM21 to NVM2n may be connected (e.g., electrically connected) to the second channel CH2 through ways W21, W22, . . . , W2n, and the nonvolatile memories NVMm1 to NVMmn may be connected (e.g., electrically connected) to the m-th channel CHm through ways Wm1, Wm2, . . . , Wmn. In some example embodiments, each of the nonvolatile memories NVM11 to NVMmn may be implemented as a memory unit that may operate according to an individual command from the storage controller 620. For example, each of the nonvolatile memories NVM11 to NVMmn may be implemented as a chip or a die, but example embodiments are not limited thereto.

The storage controller 620 may transmit and receive signals to and from the memory device 610 through the plurality of channels CH1 to CHm. For example, the storage controller 620 may transmit commands CMDa, CMDb, . . . , CMDm, addresses ADDRa, ADDRb, . . . , ADDRm, and data DATAa, DATAb, . . . , DATAm to the memory device 610 through the channels CH1 to CHm, or may receive the data DATAa to DATAm from the memory device 610 through the channels CH1 to CHm.

The storage controller 620 may select one of the nonvolatile memories NVM11 to NVMmn, which is connected (e.g., electrically connected) to one of the channels CH1 to CHm, using a corresponding one of the ways W11 to Wmn, and may transmit and receive signals to and from the selected nonvolatile memory. For example, the storage controller 620 may select the nonvolatile memory NVM11 from among the nonvolatile memories NVM11 to NVM1n connected (e.g., electrically connected) to the first channel CH1 (by using the way W11). The storage controller 620 may transmit the command CMDa, the address ADDRa, and the data DATAa to the selected nonvolatile memory NVM11 through the first channel CH1 or may receive the data DATAa from the selected nonvolatile memory NVM11 through the first channel CH1.

The storage controller 620 may transmit and receive signals to and from the memory device 610 in parallel through different channels. For example, the storage controller 620 may transmit the command CMDb to the memory device 610 through the second channel CH2 while transmitting the command CMDa to the memory device 610 through the first channel CH1. For example, the storage controller 620 may receive the data DATAb from the memory device 610 through the second channel CH2 while receiving the data DATAa from the memory device 610 through the first channel CH1.

The storage controller 620 may control overall operations of the memory device 610. The storage controller 620 may transmit a signal to the channels CH1 to CHm and may control each of the nonvolatile memories NVM11 to NVMmn connected (e.g., electrically connected) to the channels CH1 to CHm. For example, the storage controller 620 may transmit the command CMDa and the address ADDRa to the first channel CH1 and may control one selected from among the nonvolatile memories NVM11 to NVM1n.

Each of the nonvolatile memories NVM11 to NVMmn may operate under the control of the storage controller 620. For example, the nonvolatile memory NVM11 may program the data DATAa based on the command CMDa, the address ADDRa, and the data DATAa provided from the storage controller 620 through the first channel CH1. For example, the nonvolatile memory NVM21 may read the data DATAb based on the command CMDb and the address ADDRb provided from the storage controller 620 through the second channel CH2 and may transmit the read data DATAb to the storage controller 620 through the second channel CH2.

Although FIG. 32 illustrates an example where the memory device 610 communicates with the storage controller 620 through m channels and includes n nonvolatile memories corresponding to each of the channels, example embodiments are not limited thereto and the number of channels and the number of nonvolatile memories connected (e.g., electrically connected) to one channel may be variously changed.

Figure 33:
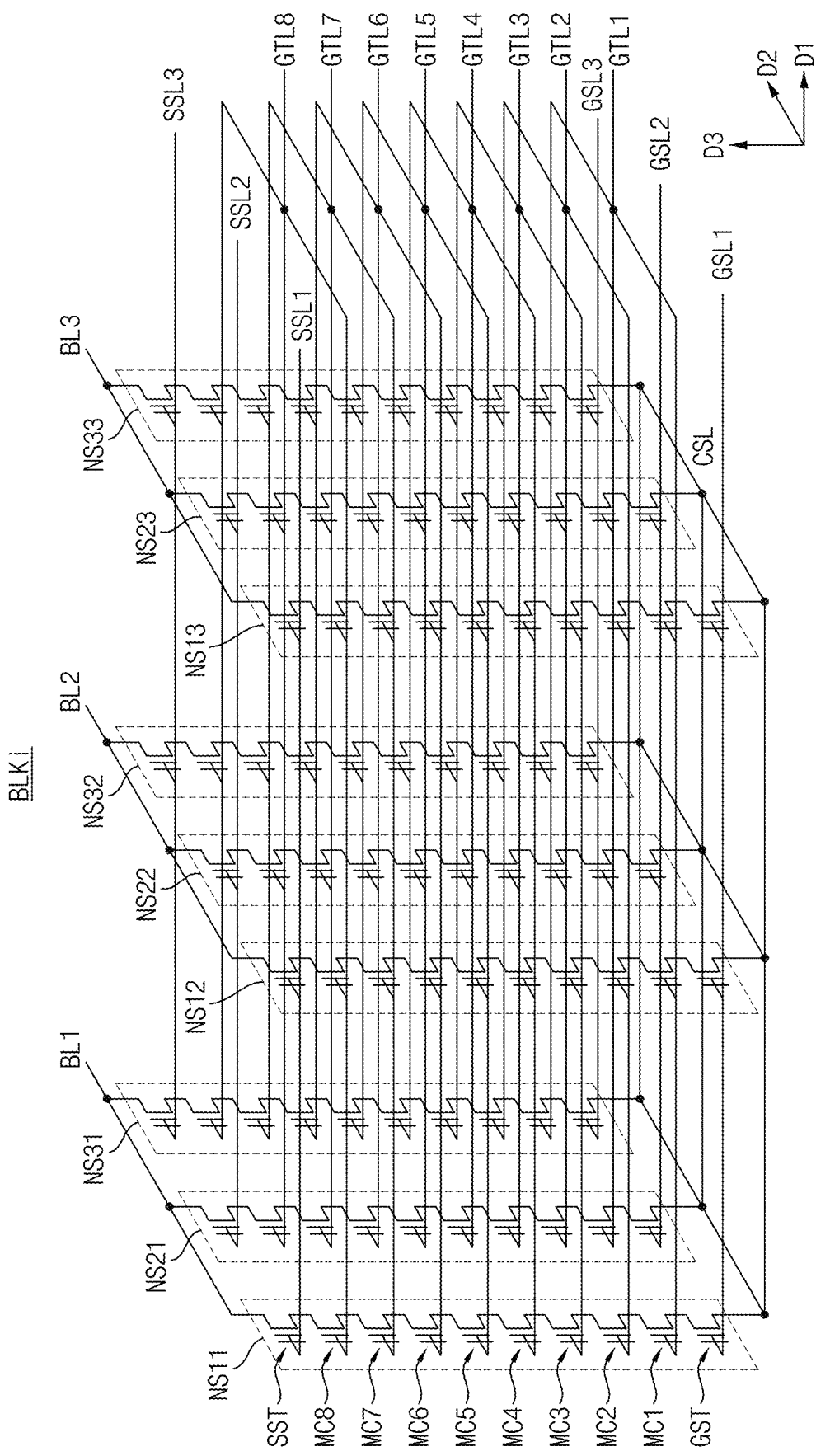
FIG. 33 is a circuit diagram illustrating an equivalent circuit of a memory block of a nonvolatile memory device included in a storage device according to example embodiments.

FIG. 33 is a circuit diagram illustrating an equivalent circuit of a memory block of a nonvolatile memory device included in a storage device according to example embodiments.

Referring to FIG. 33, each memory block BLKi included in a memory cell array 510 in FIG. 31 may be formed on a substrate in a three-dimensional structure (or a vertical structure). For example, NAND strings or cell strings included in the memory block BLKi may be formed in a vertical direction D3 perpendicular to an upper surface of a substrate. A first direction D1 and a second direction D2 are parallel to the upper surface of the substrate. The first direction D1 and the second direction D2 may intersect with (e.g., may be perpendicular to) each other.

The memory block BLKi may include, for example, NAND strings NS11 to NS33 coupled between bitlines BL1, BL2, and BL3 and a common source line CSL. Each of the NAND strings NS11 to NS33 may include a string selection transistor SST, a memory cells MC1 to MC8, and a ground selection transistor GST. In FIG. 33, each of the NAND strings NS11 to NS33 is illustrated to include eight memory cells MC1 to MC8. However, embodiments are not limited thereto, and each of the NAND strings NS11 to NS33 may include various numbers of memory cells.

Each string selection transistor SST may be connected (e.g., electrically connected) to a corresponding string selection line (one of SSL1 to SSL3). The memory cells MC1 to MC8 may be connected (e.g., electrically connected) to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected (e.g., electrically connected) to a corresponding ground selection line (one of GSL1 to GSL3). Each string selection transistor SST may be connected (e.g., electrically connected) to a corresponding bitline (e.g., one of BL1, BL2, and BL3), and each ground selection transistor GST may be connected to the common source line CSL.

Wordlines (e.g., gate line GTL1) having the same height may be commonly connected, and the ground selection lines GSL1 to GSL3 and the string selection lines SSL1 to SSL3 may be separated. In FIG. 33, the memory block BLKi is illustrated as being coupled to eight gate lines GTL1 to GTL8 and three bitlines BL1 to BL3. However, example embodiments are not limited thereto, and each memory block BLKi in the memory cell array 510 may be coupled to various numbers of wordlines and various numbers of bitlines.

Figure 34:
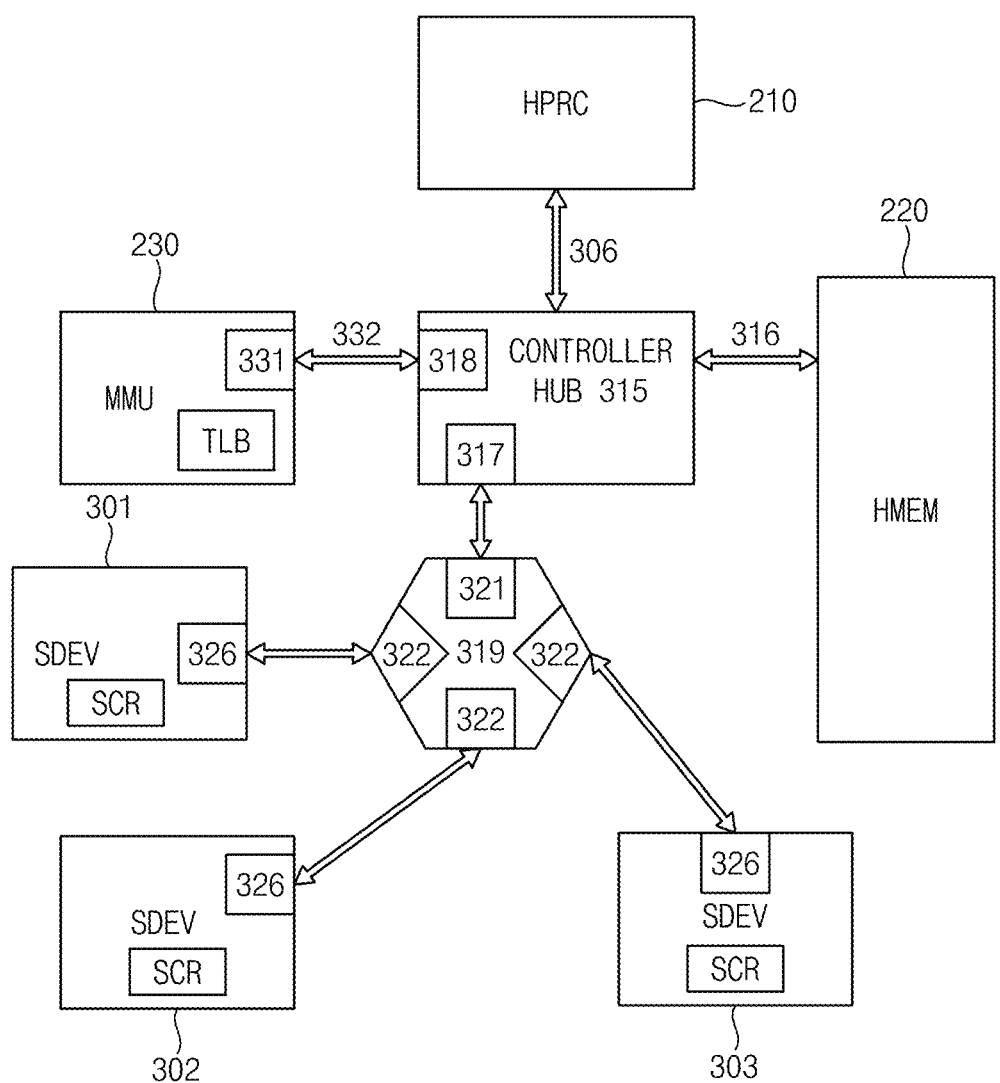
FIG. 34 is a block diagram illustrating an example embodiment of an interconnect architecture of a storage system according to example embodiments.

FIG. 34 is a block diagram illustrating an example embodiment of an interconnect architecture of a storage system according to example embodiments.

Referring to FIG. 34, an example embodiment of a design composed of point-to-point links that interconnect a set of components is illustrated. A system 102 may include host processor (HPRC) 210, a host memory device (or a system memory) (HMEM) 220, and a memory management unit (MMU) 230 connected (e.g., electrically connected) to a controller hub 315. The host processor 210 may include any processing element, such as a microprocessor, a host processor, an embedded processor, a co-processor, or other processor. The host processor 210 may be connected (e.g., electrically connected) to the controller hub 315 through a front-side bus (FSB) 306. In one example embodiment, the FSB 306 may be a serial point-to-point interconnect. In another example embodiment, the FSB 306 may include a serial, differential interconnect architecture that is compliant with a different interconnect standard.

The system memory 220 may include any memory device, such as random access memory (RAM), nonvolatile (NV) memory, solid state memory, or other memory accessible by devices in the system 102. The system memory 220 may be connected to (e.g., electrically connected to) the controller hub 315 through a memory interface 316. Examples of the memory interface 316 may include a double-data rate (DDR) memory interface, a dual-channel DDR memory interface, and a dynamic RAM (DRAM) memory interface.

In one example embodiment, the controller hub 315 may be a root hub, root complex, or root controller in a Peripheral Component Interconnect Express (PCIe or PCIE) interconnection hierarchy. Examples of the controller hub 315 may include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) connected (e.g., electrically connected) to an interconnect controller hub (ICH). Note that current systems often include the MCH integrated with the host processor 210, while the controller hub 315 is used to communicate with I/O devices, in a similar manner as described below. In some example embodiments, peer-to-peer routing is optionally supported through the root complex or the controller hub 315.

Here, the controller hub 315 may be connected (e.g., electrically connected) to a switch 319 through a serial link. Input/output modules 317 and 321, which may also be referred to as interfaces/ports 317 and 321, may include/implement a layered protocol stack to provide communication between the controller hub 315 and the switch 319. In one example embodiment, multiple devices may be capable of being connected (e.g., electrically connected) to the switch 319. The switch 319 may be referred to as a bridge.

The switch 319 may route packets/messages from storage devices 301, 302, and 303 upstream, e.g., up a hierarchy towards a root complex, to the controller hub 315 and downstream, e.g., down a hierarchy away from a root controller, from the host processor 210 or the system memory 220 to the storage devices 301, 302, and 303. The switch 319, in one example embodiment, may be referred to as a logical assembly of multiple virtual PCI-to-PCI bridge devices. The storage devices 301, 302, and 303 may include any internal or external device or component to be connected (e.g., electrically connected) to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device, is referred to as an endpoint. The storage devices 301, 302, and 303 may additionally include a PCIe to PCI/PCI-X bridge to support legacy or other version PCI devices. Endpoint devices in PCIe may often be classified as legacy, PCIe, or root complex integrated endpoints.

The memory management unit 230 may also be connected (e.g., electrically connected) to the controller hub 315 through a serial link 332. I/O modules 331 and 318 may be used to implement a layered protocol stack to communicate between the memory management unit 230 and the controller hub 315.

The memory management unit 230 may include a translation look aside buffer (TLB) configured to store the address mapping information referenced recently and/or frequently.

As described above, (each of) the storage devices 301, 302, and 303 may include a scramble circuit SCR configured to perform address scramble such that accesses to the storage devices 301, 302, and 303 may be distributed.

Figure 35:
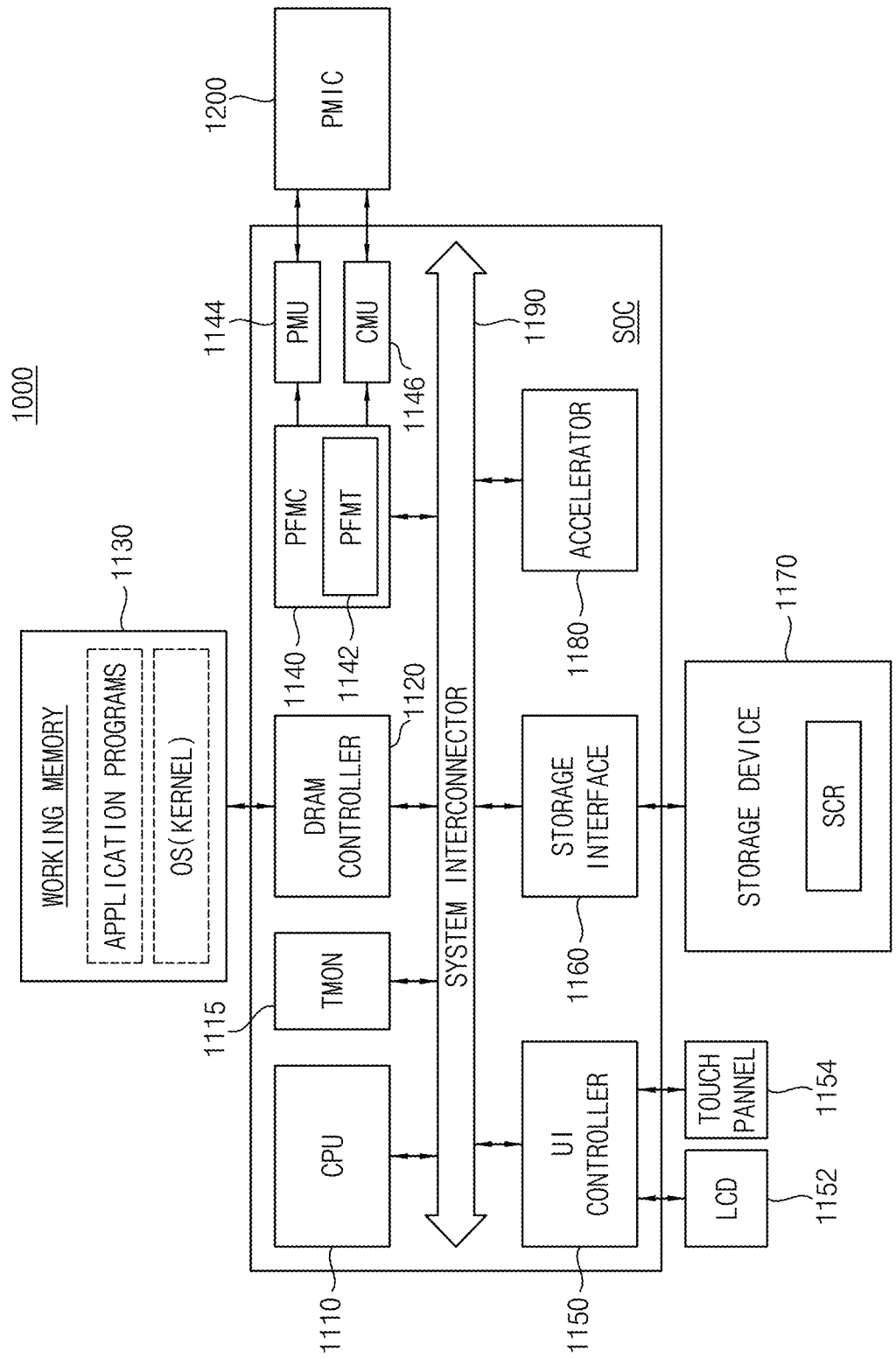
FIG. 35 is a block diagram illustrating a computing system according to example embodiments.

FIG. 35 is a block diagram illustrating a computing system according to example embodiments.

Referring to FIG. 35, a multi-core system 1000 may include a system on chip (SoC), a working memory 1130, a display device (e.g., LCD) 1152, a touch panel 1154, a storage device 1170, a power management integrated circuit (PMIC) 1200, etc. The storage device 1170 may correspond to the storage device 300 in FIG. 1. The SoC may include a central processing unit (CPU) 1110, a task monitor circuit TMON 1115, a DRAM controller 1120, a performance controller 1140, a user interface controller (UI controller) 1150, a storage interface 1160, an accelerator 1180, a power management unit (PMU) 1144, a clock management unit (CMU) 1146, etc. It will be understood that components of the multi-core system 1000 are not limited to the components shown in FIG. 35. For example, the multi-core system 1000 may further include a hardware codec for processing image data, a security block, and the like.

The CPU 1110 may execute software (for example, an application program, an operating system (OS), and/or device drivers) for the multi-core system 1000. The CPU 1110 may execute the operating system (OS) which may be loaded into the working memory 1130. The CPU 1110 may execute various application programs to be driven on the operating system (OS). The CPU 1110 may be provided as a homogeneous multi-core processor or a heterogeneous multi-core processor. A multi-core processor is a computing component including at least two independently drivable processors (hereinafter referred to as "cores" or "processor cores"). Each of the cores may independently read and execute program instructions.

The processor cores of the CPU 1100 may be grouped into a plurality of clusters that operate with an independent driving clock and an independent driving voltage. The processor cores in the same cluster may be included in a clock domain operating based on the same clock signal and/or in a power domain operating based on the same driving voltage. The driving voltage and/or the clock signal provided to each of the processor cores may be cut off or connected in units of single cores.

A kernel of the operating system (OS) may monitor the number of tasks in a task queue and the driving voltage and the driving clock of the CPU 1110 at specific time intervals to control the CPU 1110. In addition, a kernel of the operating system (OS) may control hotplug-in or hotplug-out of the CPU 1110 with reference to the monitored information. As such, as discussed in more detail below, a DVFS module and a frequency control module may be provided as a portion of the kennel.

The DRAM controller 1120 may provide interfacing between the working memory 1130 and the system-on-chip (SoC). The DRAM controller 1120 may access the working memory 1130 according to a request of the CPU 1110 or another intellectual property (IP) block.

The operating system (OS) or basic application programs may be loaded into the working memory 1130 during a booting operation. For example, an OS image stored in the storage device 1170 may be loaded into the working memory 1130 based on a booting sequence during booting of the multi-core system 1000. Overall input/output operations of the multi-core system 1000 may be supported by the operating system (OS). The working memory 1130 may be a volatile memory such as a static random access memory (SRAM) and a dynamic random access memory (DRAM) or a nonvolatile memory device such as a phase-change random-access memory (PRAM), a magnetoresistive random-access memory (MRAM), a resistive random-access memory (ReRAM), a ferroelectric random-access memory (FRAM), and a NOR flash memory.

The performance controller 1140 may adjust operation parameters of the system-on-chip (SoC) according to a control request provided from the kernel of the operating system (OS). For example, the performance controller 1140 may adjust the level of DVFS to enhance performance of the system-on-chip (SoC). Alternatively, the performance controller 1140 may generate the frequency selection signals to control the frequencies of the processor cores according to a request of the kernel. In this case, the performance controller 1140 may include a performance table PFMT 1142 to set a driving voltage and a frequency of a driving clock therein. The performance controller 1140 may control the PMU 1144 and the CMU 1146, which together form a power managing circuit, connected (e.g., electrically connected) to the PMIC 1200 to provide the determined driving voltage and the determined driving clock to each power domain.

The user interface controller 1150 may control user input and output from user interface devices. For example, the user interface controller 1150 may display a keyboard screen for inputting data to the LCD 1152 according to the control of the CPU 1110. The user interface controller 1150 may control the LCD 1152 to display data that a user requests. The user interface controller 1150 may decode data provided from user input means, such as the touch panel 1154, into user input data.

The storage interface 1160 may access the storage device 1170 according to a request of the CPU 1110. For example, the storage interface 1160 may provide interfacing between the system-on-chip (SoC) and the storage device 1170. For example, data processed by the CPU 1110 may be stored in the storage device 1170 through the storage interface 1160. Data stored in the storage device 1170 may be provided to the CPU 1110 through the storage interface 1160.

The storage device 1170 may be provided as a storage medium of the multi-core system 1000. The storage device 1170 may store application programs, an OS image, and various types of data. The storage device 170 may be provided as a memory card (e.g., MMC, eMMC, SD, MicroSD, etc.). The storage device 170 may include a NAND-type flash memory with high-capacity storage capability. The storage device 1170 may include a next-generation nonvolatile memory, such as PRAM, MRAM, ReRAM, and FRAM or a NOR-type flash memory.

The accelerator 1180 may be provided as a separate intellectual property (IP) component to increase the processing speed of a multimedia or multimedia data. For example, the accelerator 1180 may be provided as an intellectual property (IP) component to enhance processing performance of text, audio, still images, animation, video, two-dimensional data or three-dimensional data.

A system interconnector 1190 may be a system bus to provide an on-chip network in the system-on-chip (SoC). The system interconnector 1190 may include, for example, a data bus, an address bus, and a control bus. The data bus may be a data transfer path. A memory access path to the working memory 1130 or the storage device 1170 may also be provided. The address bus may provide an address exchange path between intellectual properties (IPs). The control bus may provide a path along which a control signal is transmitted between intellectual properties (IPs). However, the configuration of the system interconnector 1190 is not limited to the above description and the system interconnector 190 may further include arbitration means for efficient management.

As described above, the storage device 1170 may include a scramble circuit SCR configured to perform address scramble such that accesses to the storage device 1170 may be distributed.

Example embodiments disclosed herein may be embodied as a system, method, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that may contain, or store a program for use by or in connection with an instruction execution system, apparatus, or device.

Example embodiments of the disclosure may be applied to any electronic devices and systems. For example, the example embodiments of the disclosure may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IOT) device, an internet of everything (IoE) device, an e-book, a virtual reality (VR) device, an augmented reality (AR) device, a server system, an automotive driving system, etc.

The foregoing is illustrative of example embodiments and is not to be construed as limiting thereof. Although a few example embodiments have been described, those skilled in the art will readily appreciate that many modifications are possible in the example embodiments without materially departing from the scope of the present disclosure.

What is claimed is:

1. A method of operating a storage device including a nonvolatile memory device and a storage controller that is configured to control the nonvolatile memory device, the method comprising:
    partitioning the nonvolatile memory device into a plurality of domains;
    determining a scramble function based on a seed value of seed bits that correspond to a first portion of a plurality of address bits of a logical address among a plurality of logical addresses that are provided from a host device;
    generating a scrambled domain value based on the scramble function and a domain value of domain bits that correspond to a second portion of the plurality of address bits of the logical address among the plurality of logical addresses; and
    assigning a write operation that corresponds to the logical address to a domain that corresponds to the scrambled domain value among the plurality of domains.

2. The method of claim 1, further comprising:
    setting a bit number of the domain bits based on a number of a plurality of channels that electrically connects the storage controller and the nonvolatile memory device.

3. The method of claim 1, wherein the first portion corresponds higher bits of the plurality of address bits of the logical address among the plurality of logical addresses than the second portion.

4. The method of claim 3, further comprising:
    setting a third portion of the plurality of address bits of the logical address among the plurality of logical addresses to granularity bits that are lower bits of the plurality of address bits of the logical address among the plurality of logical addresses than the second portion.

5. The method of claim 4, wherein, responsive to determining that a bit number of the granularity bits is a natural number M, write operations that correspond to $2^M$ of sequential logical addresses among the plurality of logical addresses are assigned to a same domain among the plurality of domains.

6. The method of claim 4, further comprising:
    setting a bit number of the granularity bits based on a memory capacity of the storage controller and a number of the plurality of domains.

7. The method of claim 1, further comprising:
    partitioning each domain of the plurality of domains into a plurality of sub domains.

8. The method of claim 7, further comprising:
    determining a sub scramble function based on a sub seed value of sub seed bits that correspond to a first portion of the seed bits;
    generating a scrambled sub domain value based on the sub scramble function and a sub domain value of sub domain bits that correspond to a second portion of the seed bits; and
    assigning the write operation that corresponds to the logical address among the plurality of logical addresses to a sub domain that corresponds to the scrambled sub domain value among the plurality of sub domains.

9. The method of claim 8, further comprising:
    setting a bit number of the domain bits based on a number of a plurality of channels that electrically connects the storage controller and the nonvolatile memory device; and
    setting a bit number of the sub domain bits based on a number of ways that are electrically connected to each channel of the plurality of channels.

10. The method of claim 1, further comprising: receiving a request from the host device for performing a same operation with respect to an address range that includes a plurality of sequential logical addresses among the plurality of logical addresses; and
    classifying the address range into a body range and an edge range responsive to the receiving the request.

11. The method of claim 10, wherein the body range includes unit ranges, and
    wherein, responsive to determining that a bit number of the seed bits is N, where N is a natural number, each of the unit ranges includes $2^N$ of sequential logical addresses that correspond to a same seed value among the plurality of sequential logical addresses.

12. The method of claim 10, wherein the generating the scrambled domain value comprises:
omitting the generating the scrambled domain value with respect to first logical addresses that correspond to the body range among the plurality of sequential logical addresses among the plurality of logical addresses, and
wherein the generating the scrambled domain value includes generating the scrambled domain value with respect to second logical addresses that correspond to the edge range among the plurality of sequential logical addresses among the plurality of logical addresses.

13. The method of claim 12, further comprising:
performing the same operation with respect to the first logical addresses that correspond to the body range based on the domain value; and
performing the same operation with respect to the second logical addresses that correspond to the edge range based on the scrambled domain value.

14. A storage device comprising:
a nonvolatile memory device that includes a plurality of domains; and
a storage controller that is configured to control the nonvolatile memory device,
the storage controller including:
a scramble circuit that is configured to determine a scramble function based on a seed value of seed bits that correspond to a first portion of a plurality of address bits of a logical address among a plurality of logical addresses that are provided from a host device and is configured to generate a scrambled domain value based on the scramble function and a domain value of domain bits that correspond to a second portion of the plurality of address bits of the logical address among the plurality of logical addresses; and
a processor that is configured to assign a write operation that corresponds to the logical address to a domain that corresponds to the scrambled domain value among the plurality of domains.

15. The storage device of claim 14, wherein, a bit number of granularity bits that correspond to a third portion of the plurality of address bits of the logical address among the plurality of logical addresses is a natural number M, and
wherein the processor is configured to assign write operations that correspond to $2^M$ of sequential logical addresses among the plurality of logical addresses to a same domain among the plurality of domains.

16. The storage device of claim 14, wherein the scramble circuit is configured to partition each domain of the plurality of domains into a plurality of sub domains, determine a sub scramble function based on a sub seed value of sub seed bits that correspond to a first portion of the seed bits, and generate a scrambled sub domain value based on the sub scramble function and a sub domain value of sub domain bits that correspond to a second portion of the seed bits, and
wherein the processor is configured to assign the write operation that corresponds to the logical address among the plurality of logical addresses to a sub domain that corresponds to the scrambled sub domain value among the plurality of sub domains.

17. The storage device of claim 14, wherein the storage controller further includes:
a range operation controller that is configured to, responsive to receiving a request from the host device for performing a same operation with respect to an address range including a plurality of sequential logical addresses among the plurality of logical addresses, classify the address range into a body range and an edge range excluding the body range.

18. The storage device of claim 17, wherein the range operation controller is configured to provide logical addresses that correspond to the body range to the processor and provide scrambled logical addresses to the processor by replacing the domain value of logical addresses that correspond to the edge range with the scrambled domain value.

19. A method of operating a storage device including a nonvolatile memory device and a storage controller that is configured to control the nonvolatile memory device, the method comprising:
partitioning the nonvolatile memory device into a plurality of domains;
determining a scramble function based on a seed value of seed bits that correspond to a first portion of a plurality of address bits of a logical address among a plurality of logical addresses that are provided from a host device;
generating a scrambled domain value based on the scramble function and a domain value of domain bits that correspond to a second portion of the plurality of address bits of the logical address among the plurality of logical addresses;
assigning a write operation that corresponds to the logical address to a domain that corresponds to the scrambled domain value among the plurality of domains; and
responsive to receiving a request from the host device for performing a same operation with respect to an address range that includes a plurality of sequential logical addresses among the plurality of logical addresses, classifying the address range into a body range and an edge range,
wherein the generating the scrambled domain value comprises:
omitting the generating the scrambled domain value with respect to the body range.

20. The method of claim 19, wherein the same operation is performed with respect to the body range based on the domain value, and the same operation is performed with respect to the edge range based on the scrambled domain value.

* * * * *